US011213957B2

(12) United States Patent
Lin et al.

(10) Patent No.: US 11,213,957 B2
(45) Date of Patent: Jan. 4, 2022

(54) ROBOTIC SYSTEM WITH RECONFIGURABLE END-EFFECTOR ASSEMBLY

(71) Applicant: GM Global Technology Operations LLC, Detroit, MI (US)

(72) Inventors: Yhu-Tin Lin, Rochester Hills, MI (US); Erik B. Golm, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 16/653,274

(22) Filed: Oct. 15, 2019

(65) Prior Publication Data

US 2021/0107167 A1    Apr. 15, 2021

(51) Int. Cl.
*B25J 15/00* (2006.01)
*B25J 15/06* (2006.01)

(52) U.S. Cl.
CPC ....... *B25J 15/0061* (2013.01); *B25J 15/0616* (2013.01)

(58) Field of Classification Search
CPC . B25J 15/0061; B25J 15/0616; B25J 19/0004
See application file for complete search history.

(56) References Cited

U.S. PATENT DOCUMENTS

| 10,011,022 | B1* | 7/2018 | Lin | B25J 15/0061 |
| 10,011,023 | B1* | 7/2018 | Lin | B25J 15/0061 |
| 2009/0193642 | A1* | 8/2009 | Lin | B25J 15/0061 29/428 |
| 2009/0288458 | A1* | 11/2009 | Lin | B25B 11/005 70/174 |
| 2011/0017007 | A1* | 1/2011 | Lin | B25J 15/0491 74/490.01 |
| 2020/0140969 | A1* | 5/2020 | Monroe | C21D 8/065 |

* cited by examiner

*Primary Examiner* — Stephen A Vu
(74) *Attorney, Agent, or Firm* — Vivacqua Crane PLLC

(57) ABSTRACT

An end-effector assembly comprising a master boom, a crossbar coupled to the master boom, at least one branch rail, and a swing arm is provided. The at least one branch rail is movably coupled to the crossbar by a branch lock. The at least one branch rail has a driving groove formed longitudinally therealong for telescopic movement relative to the crossbar. The branch lock comprises a crossbar clamp and a branch rail clamp. The crossbar clamp is slidably and pivotally disposed about the crossbar for slidable and pivotal movement therealong. The branch rail clamp comprises a body having a primary telescoping lock including a receiving bore formed therethrough and a wedging collet disposed in the receiving bore. The body further comprises a secondary telescoping lock having a ball and a plunger disposed in a ball-plunger cavity of the body.

19 Claims, 13 Drawing Sheets

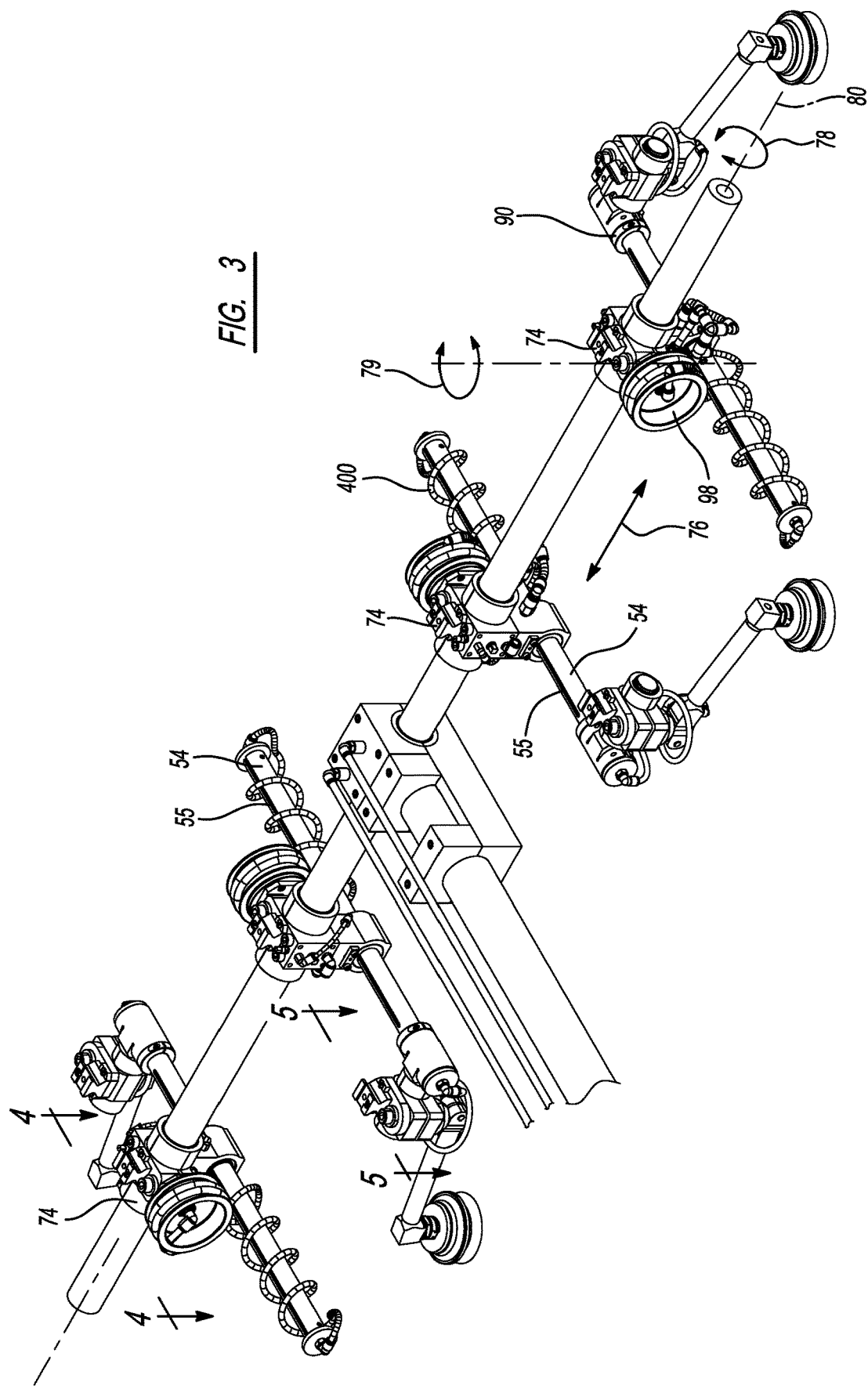

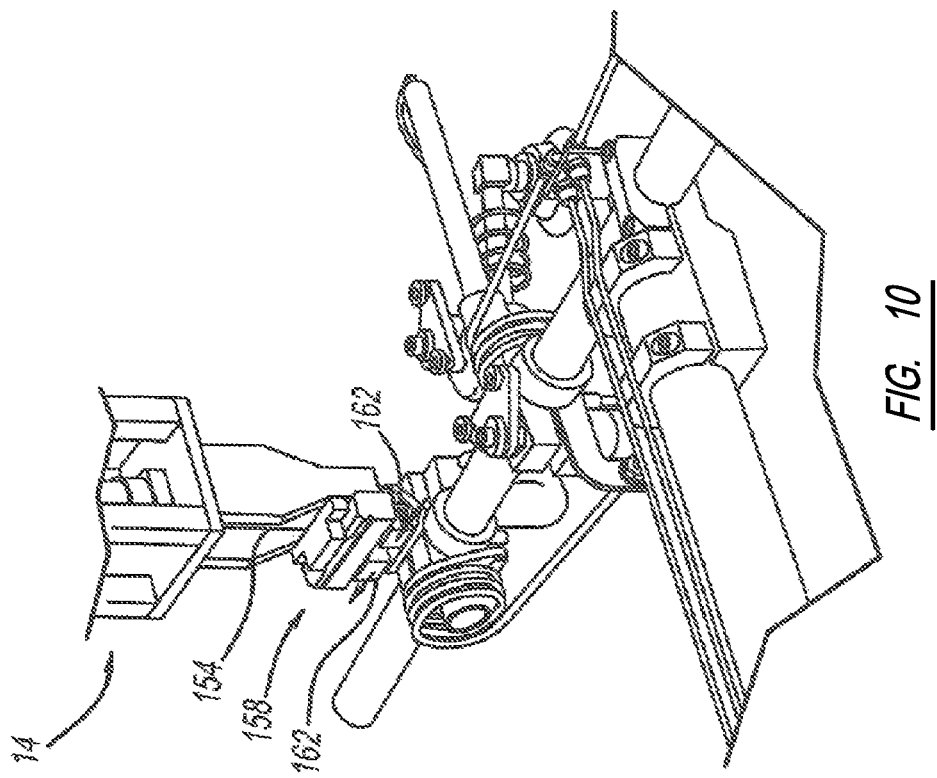
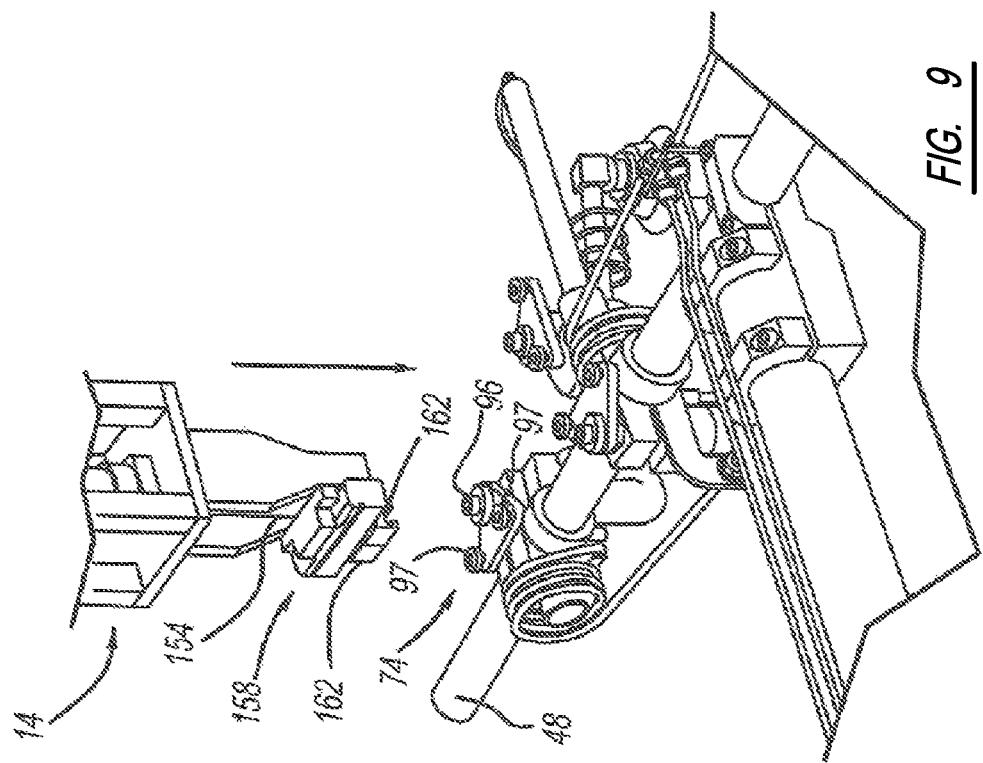

ROBOTIC SYSTEM WITH RECONFIGURABLE END-EFFECTOR ASSEMBLY

FIELD

The present disclosure relates to a robotic system with a reconfigurable end-effector assembly.

INTRODUCTION

The statements in this section merely provide background information related to the present disclosure and may not constitute prior art.

Multi-axis industrial robots include articulated arms connected via joints. Each arm segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as joint rotation and rotation/translation of a wrist disposed at a distal end of the second arm. Additional arms may be used in a serial arrangement depending on the design and an end-effector connected to the wrist may be manipulated to perform a desired work task.

The term "end-effector" refers to the particular end linkages or segments that, depending on the design of the robot, can securely grip, transport, orient, and release a workpiece. Certain end-effector assemblies are formed via a latticed array of elongated beams and/or rails to which are attached a set of tool branches suspended with end tools (e.g., suction cups or grippers of the type used for moving metal panels or panes of glass in a manufacturing facility). The individual tool branches and end tools traditionally are manually assembled or adjusted by an operator to a predetermined configuration prior to performing a specified work task.

SUMMARY

In one aspect of the present disclosure, an end-effector assembly includes a master boom, a crossbar coupled thereto, an at least one branch rail movably coupled to the crossbar by a branch lock, and a swing arm movably coupled to the at least one branch rail by a swing arm lock. The at least one branch rail is movably coupled to the crossbar by a branch lock. The at least one branch rail has a driving groove formed longitudinally therealong for telescopic movement relative to the crossbar. The at least one branch lock comprises a crossbar clamp and a branch rail clamp.

In this embodiment, the crossbar clamp is slidably and pivotally disposed about the crossbar for slidable and pivotal movement therealong. The crossbar clamp has a clamp arm adjoined with a clamp base defining a clamp recess through which the crossbar is slidably disposed. The clamp arm and clamp base are configured to be cooperable to secure and loosen about the crossbar, allowing for slidable and pivotal movement therealong.

The branch rail clamp comprises a first body having a primary telescoping lock. The primary telescoping lock comprises a receiving bore formed therethrough with internal threads in the middle as well as a wedging cavity at the distal end and a wedging collet disposed in the receiving bore. The wedging collet comprises a first outer wall and a first inner wall defining a branch hole to receive one branch rail. The first outer wall has a locking ramp formed thereabout, external threads matingly coupled to the internal threads in the receiving bore and slit taper wall at the distal end. The first inner wall has a drive pin extending inwardly therefrom and disposed in the driving groove of the branch rail.

The first body further comprises a secondary telescoping lock having a ball, a plunger, and a compression spring disposed in a ball-plunger cavity of the first body. The ball-plunger cavity has a through hole in fluid communication with the receiving bore and in alignment with the locking ramp of the wedging collet.

In this embodiment, the wedging collet and wedging cavity are in cooperating relationship such that the slit taper wall of the wedging collet engages with the wedging cavity via the thread-in movement of the wedging collet driven by the clockwise rotation of the branch rail through the coupling of the drive pin to prevent telescopic movement of the branch rail relative to the crossbar, defining a primary locked state. Moreover, the wedging collet and the wedging cavity are in cooperating relationship such that the wedging collet disengages from the wedging cavity via the thread-out movement of the wedging collet driven by the counter-clockwise rotation of the branch rail through the coupling of the drive pin to allow telescopic movement of the branch rail relative to the crossbar, defining a primary unlocked state.

In this embodiment, the ball and the plunger are in cooperating relationship such that the ball is displaced and closed in the through hole by the plunger and is engaged against the locking ramp when positive pressure is placed in the cavity, defining a secondary locked state. Accordingly, the ball and the plunger are in cooperating relationship such that the ball is in the ball-plunger cavity and is disengaged from the locking ramp when no pressure is placed in the ball-plunger cavity and the compression spring pushes the plunger to open up the through hole to the ball-plunger cavity, defining a secondary unlocked state. Further, the branch rail is telescopically moveable relative to the crossbar when the drive pin and the branch rail are in the primary unlocked state and when the ball and the plunger are in the secondary unlocked state.

In one embodiment, the swing arm lock comprises a swing arm clamp assembly configured to movably secure the swing arm to the branch rail. The swing arm clamp assembly comprises a roll clamp movably secured to the branch rail. The roll clamp comprising a second body and a shaft. The second body has a first end extending to a second end, and has an opening formed through the first and second ends to define a second outer wall movably disposed about the branch rail. The shaft has a proximal end extending to a closed distal end. The proximal end is disposed on the second outer wall and extends therefrom. The second body has a slot formed through the second outer wall from the first and second ends and through the proximal end of the shaft, defining first and second split portions of the shaft. The distal end is closed. In this embodiment, the clamp assembly further comprises a pitch-yaw clamp movably secured about the shaft and configured to lock and unlock the roll clamp to the branch rail.

The swing arm lock further comprises a pivot shaft extending through the clamp assembly and configured to rotationally secure the clamp assembly in place. The swing arm lock further comprises a swing plate secured to the pivot shaft and configured for engagement with a configuration tool. The swing arm lock also further comprises a locking fastener extending through the swing plate and into the pivot shaft. The locking fastener is configured to lock and unlock the pitch-yaw clamp about the shaft, thereby locking and unlocking the roll clamp to the branch rail.

In one embodiment, the swing arm lock is movable on the branch rail between an unlocked and a locked state so as to fix the swing arm in position relative to the branch rail.

In another embodiment, the first end of the roll clamp comprises a first bearing bushing and a first bushing collet attached thereto. The first end has a collar retainer attached to the first bushing collet. In this embodiment, the second end comprises a second bearing bushing and second bushing collet attached thereto. The second end has an endcap retainer attached to the second bushing collet.

In yet another embodiment, the branch lock further comprises an extension leg for receiving a portion of a tubing, wherein the extension leg is elongated along a protrusion axis arranged perpendicularly to a body axis, the extension leg comprising a spring-loaded tubing reel configured to stretch during use and collapse during non-use. The spring-loaded tubing reel comprises a drum having a hub, the reel being coupled to a shaft of a reel support, the drum and reel support being held together with a retaining ring, a spiral-shaped power spring being disposed between the drum and the reel support.

In another aspect of the present disclosure, an end-effector assembly comprises a master boom, a crossbar coupled to the master boom, at least one branch rail movably coupled to the crossbar by a branch lock, and a swing arm movably coupled to the at least one branch rail by a swing arm lock. The at least one branch rail has a driving groove formed longitudinally therealong for telescopic movement relative to the crossbar.

In this embodiment, the at least one swing branch comprises a crossbar clamp slidably and pivotally disposed about the crossbar for slidable and pivotal movement therealong. The crossbar clamp has a clamp arm adjoined with a clamp base defining a clamp recess through which the crossbar is disposed. The clamp arm and clamp base are configured to be cooperable to secure and loosen about the crossbar allowing for slidable and pivotal movement therealong.

In this embodiment, the at least one swing branch comprises a branch rail clamp comprising a first body having a primary telescoping lock. The primary telescoping lock comprises a receiving bore formed therethrough with internal threads in the middle as well as a wedging cavity at the distal end and a wedging collet disposed in the receiving bore. The wedging collet comprises a first outer wall and a first inner wall defining a branch hole to receive one branch rail. The first outer wall has a locking ramp formed thereabout, external threads matingly coupled to the internal threads in the receiving bore and slit taper wall at the distal end. The first inner wall has a drive pin extending inwardly therefrom and disposed in the driving groove of the branch rail.

In this embodiment, the first body further comprises a secondary telescoping lock having a ball, a plunger and a compression spring disposed in a ball-plunger cavity of the body. The ball-plunger cavity has a through hole in fluid communication with the receiving bore and in alignment with the locking ramp of the wedging collet. In this example, the wedging collet and the wedging cavity are in cooperating relationship such that the slit taper wall of the wedging collet engages with the wedging cavity to prevent telescopic movement of the branch rail relative to the crossbar, defining a primary locked state. Moreover, the wedging collet and the wedging cavity are in cooperating relationship such that the slit taper wall of the wedging collet disengages from the wedging cavity to allow telescopic movement of the branch rail relative to the crossbar, defining a primary unlocked state.

Further to this embodiment, the ball and the plunger are in cooperating relationship such that the ball is displaced and closed in the through hole and is engaged against the locking ramp when positive pressure is placed in the ball-plunger cavity, defining a secondary locked state. Accordingly, the ball and the plunger are in cooperating relationship such that the ball is in the ball-plunger cavity and is disengaged from the locking ramp when no pressure is placed in the cavity and the compression spring pushes the plunger to open up the through hole to the ball-plunger cavity, defining a secondary unlocked state. Furthermore, the branch rail is telescopically moveable relative to the crossbar when the drive pin and the branch rail are in the primary unlocked state and when the ball and the plunger are in the secondary unlocked state.

In one embodiment, the swing arm lock comprises a swing arm clamp assembly configured to movably secure the swing arm to the branch rail. The swing arm clamp assembly comprises a roll clamp movably secured to the branch rail. The roll clamp comprising a second body and a shaft. The second body has a first end extending to a second end, and has an opening formed through the first and second ends to define a second outer wall movably disposed about the branch rail. The shaft has a proximal end extending to a closed distal end. The proximal end is disposed on the second outer wall and extends therefrom. The second body has a slot formed through the second outer wall from the first and second ends and through the proximal end of the shaft, defining first and second split portions of the shaft. The distal end is closed. In this embodiment, the clamp assembly further comprises a pitch-yaw clamp movably secured about the shaft and configured to lock and unlock the roll clamp to the branch rail.

The swing arm lock further comprises a pivot shaft extending through the clamp assembly and configured to rotationally secure the clamp assembly in place. The swing arm lock further comprises a swing plate secured to the pivot shaft and configured for engagement with a configuration tool. The swing arm lock also further comprises a locking fastener extending through the swing plate and into the pivot shaft. The locking fastener is configured to lock and unlock the pitch-yaw clamp about the shaft, thereby locking and unlocking the roll clamp to the branch rail.

In one embodiment, the swing arm lock is movable on the branch rail between an unlocked and a locked state so as to fix the swing arm in position relative to the branch rail.

In another embodiment, the first end of the roll clamp comprises a first bearing bushing and a first bushing collet attached thereto. The first end has a collar retainer attached to the first bushing collet. In this embodiment, the second end comprises a second bearing bushing and second bushing collet attached thereto. The second end has an endcap retainer attached to the second bushing collet.

In yet another embodiment, the branch lock further comprises an extension leg for receiving a portion of a tubing, wherein the extension leg is elongated along a protrusion axis arranged perpendicularly to a body axis.

In another example, the end-effector assembly further comprises an end tool arranged at a distal end of the swing arm. The end tool defines a first side of the end-effector assembly for engagement with a workpiece, wherein the branch lock and the swing arm lock are configured to be engaged by the configuration tool on a second side of the end-effector assembly opposite to the first side.

In another embodiment, the branch lock further comprises an extension leg for receiving a portion of a tubing, wherein the extension leg is elongated along a protrusion axis arranged perpendicularly to a pivot shaft axis, the extension leg comprising a spring-loaded tubing reel configured to stretch during use and collapse during non-use. The spring-loaded tubing reel comprises a drum having a hub, the reel being coupled to a shaft of a reel support, the drum and reel support being held together with a retaining ring, a spiral-shaped power spring being disposed between the drum and the reel support.

In another aspect of the present disclosure, an end-effector assembly comprises a master boom, a crossbar coupled to the master boom, at least one branch rail movably coupled to the crossbar by a branch lock, and a swing arm movably coupled to the at least one branch rail by a swing arm lock. The at least one branch rail has a driving groove formed longitudinally therealong for telescopic movement relative to the crossbar.

In this embodiment, the at least one swing branch comprises a crossbar clamp slidably and pivotally disposed about the crossbar for slidable and pivotal movement therealong. The crossbar clamp has a clamp arm adjoined with a clamp base defining a clamp recess through which the crossbar is disposed. The clamp arm and clamp base are configured to be cooperable to secure and loosen about the crossbar allowing for slidable and pivotal movement therealong.

In this embodiment, the at least one swing branch comprises a branch rail clamp comprising a first body having a primary telescoping lock. The primary telescoping lock comprises a receiving bore formed therethrough with internal threads in the middle as well as a wedging cavity at the distal end and a wedging collet disposed in the receiving bore. The wedging collet comprises a first outer wall and a first inner wall defining a branch hole to receive one branch rail. The first outer wall has a locking ramp formed thereabout, external threads matingly coupled to the internal threads in the receiving bore and slit taper wall at the distal end. The first inner wall has a drive pin extending inwardly therefrom and disposed in the driving groove of the branch rail.

In this embodiment, the first body further comprises a secondary telescoping lock having a ball, a plunger and a compression spring disposed in a ball-plunger cavity of the body. The ball-plunger cavity has a through hole in fluid communication with the receiving bore and in alignment with the locking ramp of the wedging collet.

Further to this embodiment, the swing arm lock comprises a swing arm clamp assembly configured to movably secure the swing arm to the branch rail. The swing arm clamp assembly comprises a roll clamp movably secured to the branch rail. The roll clamp comprising a second body and a shaft. The second body has a first end extending to a second end, and has an opening formed through the first and second ends to define a second outer wall movably disposed about the branch rail. The shaft has a proximal end extending to a closed distal end. The proximal end is disposed on the second outer wall and extends therefrom. The second body has a slot formed through the second outer wall from the first and second ends and through the proximal end of the shaft, defining first and second split portions of the shaft. The distal end is closed. In this embodiment, the clamp assembly further comprises a pitch-yaw clamp movably secured about the shaft and configured to lock and unlock the roll clamp to the branch rail.

In this embodiment, the swing arm lock further comprises a pivot shaft extending through the clamp assembly and configured to rotationally secure the clamp assembly in place. The swing arm lock further comprises a swing plate secured to the pivot shaft and configured for engagement with a configuration tool. The swing arm lock also further comprises a locking fastener extending through the swing plate and into the pivot shaft. The locking fastener is configured to lock and unlock the pitch-yaw clamp about the shaft, thereby locking and unlocking the roll clamp to the branch rail.

In another embodiment, the wedging collet and the wedging cavity are in cooperating relationship such that the slit taper wall of the wedging collet engages with the wedging cavity to prevent telescopic movement of the branch rail relative to the crossbar, defining a primary locked state. In this example, the wedging collet and the wedging cavity are in cooperating relationship such that the slit taper wall of the wedging collet disengages from the wedging cavity to allow telescopic movement of the branch rail relative to the crossbar, defining a primary unlocked state.

In another embodiment, the ball and the plunger are in cooperating relationship such that the ball is displaced and closed by the plunger in the through hole and is engaged against the locking ramp when positive pressure is placed in the cavity, defining a secondary locked state. Moreover, the ball and the plunger are in cooperating relationship such that the ball is in the ball-plunger cavity and is disengaged from the locking ramp when no pressure is placed in the cavity, and the compression spring pushes the plunger to open up the through hole to the ball-plunger cavity, defining a secondary unlocked state. Also, the branch rail is telescopically moveable relative to the crossbar when the drive pin and the branch rail are in the primary unlocked state and when the ball and the plunger are in the secondary unlocked state. Furthermore, the branch lock further comprises an extension leg for receiving a portion of a tubing, wherein the extension leg is elongated along a protrusion axis arranged perpendicularly to a body shaft axis, the extension leg comprising a spring-loaded tubing reel configured to stretch during use and collapse during non-use. The spring-loaded tubing reel comprises a drum having a hub, the reel being coupled to a shaft of a reel support, the drum and reel support being held together with a retaining ring, a spiral-shaped power spring being disposed between the drum and the reel support.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a perspective view of the end-effector assembly of FIG. 1 in a second orientation;

FIG. 9 is a perspective view of the configuration tool moving toward a branch lock of the end-effector assembly;

FIG. 10 is a perspective view of the configuration tool coupled to the branch lock of the end-effector assembly;

DETAILED DESCRIPTION

Figure 1:
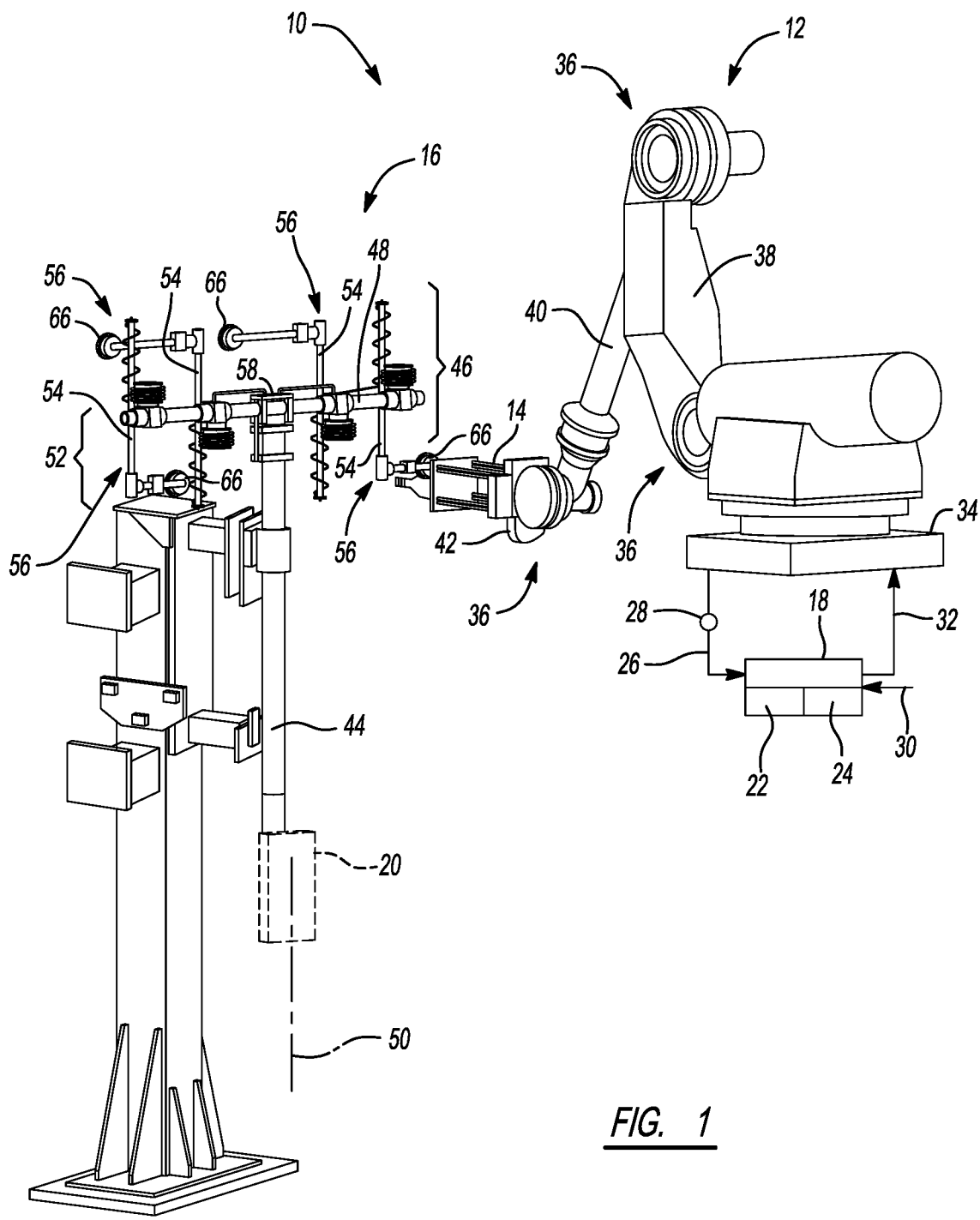
FIG. 1 is a perspective view of a robotic system including an end-effector assembly according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Referring to the drawings, wherein like reference numbers refer to like components throughout the several figures, a robotic system 10 is shown schematically in FIG. 1. The robotic system 10 includes a multi-axis industrial robot 12, a configuration tool 14, and a reconfigurable end-effector assembly 16 described in detail below. Overall operational control of the robotic system 10 may be achieved via a controller 18. The robotic system 10 also includes a configuration stand 20, as will be discussed in greater detail below.

The controller 18 may be configured as a host machine (e.g., a digital computer), which is specially programmed to execute steps or instructions. To that end, the controller 18 includes sufficient hardware to perform the required method steps, i.e., with sufficient memory 22, a processor 24, and other associated hardware such as a high-speed clock, analog-to-digital and/or digital-to-analog circuitry, a timer, input/output circuitry and associated devices, signal conditioning and/or signal buffering circuitry. The memory 22 includes sufficient tangible, non-transitory memory such as magnetic or optical read-only memory, flash memory, etc., as well as random access memory, electrically erasable programmable read only memory, and the like. The controller 18 receives and records the measured joint positions (arrow 26) from at least one position sensor 28, and also monitors forces applied by or to the end-effector assembly 16 in the course of configuring the end-effector assembly 16, as well as, while operating on a given workpiece (not shown). The controller 18 generates or receives input signals (arrow 30) informing the controller 18 as to the required work task(s) to perform on the corresponding workpiece(s) and outputs control signals (arrow 32) to the robot 12 to command the required actions from the robot 12.

The robot 12 may be configured as a 6-axis industrial robot and may include a fixed or mobile base 34 and a plurality of robotic joints 36, at least some of which are shown in FIG. 1. The various joints 36 connect segments or serial linkages of the robot 12, including a first or lower robotic arm 38, a second or upper robotic arm 40, and a wrist 42, which collectively provide the desired range of motion and number of control degrees of freedom needed for performing assigned work tasks. It is contemplated that the robot 12 may include more or fewer robotic arms and wrists. Examples of such work tasks performed by the robot 12 include the grasping, lifting, locating, and placement of panels of metal or glass panes, along with a host of other possible tasks, such as painting and welding. Joint position sensors 28 may be positioned with respect to each joint 36 and configured to measure and report the measured joint positions (arrow 26) to the controller 18, as previously discussed. Additionally, one or more force sensors (not shown) may also be positioned with respect to the joints 36 and used to provide force or torque feedback to the controller 18, which may avoid excessive force on the workpiece or the end-effector assembly 16.

With respect to the end-effector assembly 16, this structure may include a master boom 44 and a latticed end-effector array 46. The end-effector array 46 in the depicted embodiments includes one crossbar or crossbar 48 arranged orthogonally with respect to a longitudinal axis 50 of the master boom 44. It is contemplated, however, that the end-effector array 46 may include more than one crossbar 48. In the depicted embodiment, the crossbar 48 has a substantially cylindrical shape. The end-effector array 46 may also include a plurality of tool branches 52 movably coupled to the crossbar 48. However, the end-effector array 46 may alternatively have only a single tool branch 52. Each tool branch 52 includes a branch rail 54 and a tool module 56 cantilevered from the crossbar 48 and extending radially outward from the crossbar 48. The various branch rails 54 are slidingly and rotatingly attached to the crossbar 48. In other words, the branch rails 54 are movably coupled to the crossbar 48, as will be described in greater detail below. Individual tool modules 56 are suspended from or movably coupled to the branch rails 54. The crossbar 48 is connected, in turn, to the master boom 44 via a mechanical coupling 58.

Figure 2:
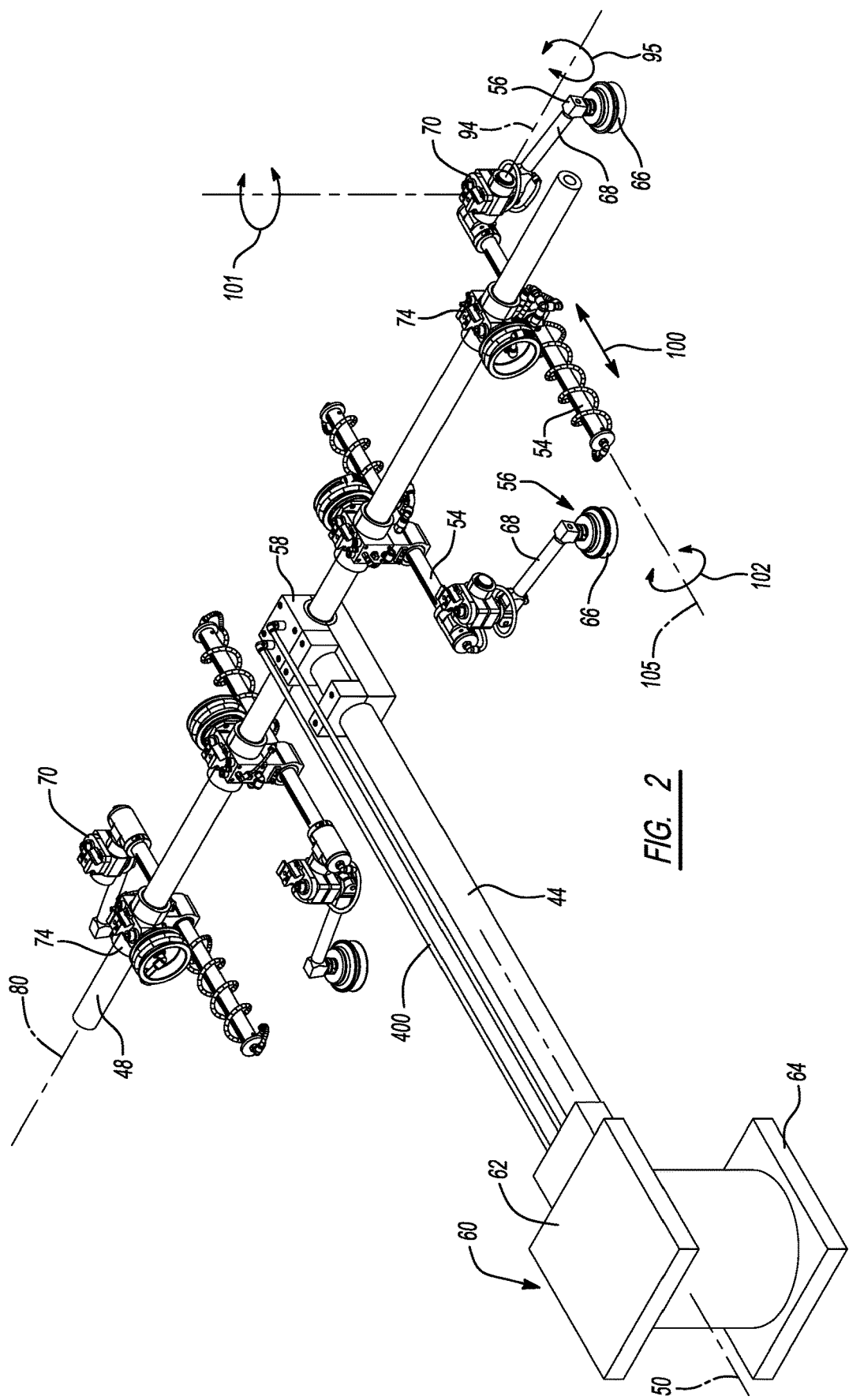
FIG. 2 is a perspective view of the end-effector assembly of FIG. 1 in a first orientation.

With reference now to FIG. 2, the master boom 44 may include a double-sided tool changer assembly 60 having opposing tool changers 62, 64. The term "tool changer" refers to manual or automatic assemblies that enable rapid change out of robotic end-effectors. Such devices typically include integrated power and communications ports, connectors, and the like as needed for functioning of an end tool, such as grippers or vacuum suction cups 66. In the depicted embodiment, the tool changer assembly 60 is specially configured to provide simultaneous engagement of the master boom 44 with both the robot 12 and the configuration stand 20, the latter of which is shown in FIG. 1.

For the purposes of the present disclosure, the configuration stand 20 may be fixed with respect to a floor or suspended from a vertical surface such as a machine column or wall. The configuration stand 20 has a predetermined position in a Cartesian (e.g., XYZ) frame of reference, and thus provides a calibrated reference point for zeroing of the robot 12 during reconfiguration of the end-effector assembly 16. For example, when transitioning from a first configuration to another configuration, the robot 12 connects the tool changer 64 to the configuration stand 20 and releases the tool changer 62. As the robot 12 reconfigures the end-effector assembly 16, the locations in free space of each of the locking mechanisms (e.g., branch lock mechanism 74 and swing arm lock mechanism 70) described below is known to the controller 18 by virtue of the known location in the frame of reference provided by the configuration stand 20. In the event the configuration of the end-effector assembly 16 becomes unknown during an operation (e.g., due to an impact event or power failure), the end-effector assembly 16, while suspended from the configuration stand 20, can be manually set to a calibrated setting in which the positions of the various end tools and locking mechanisms are known, with configuration thereafter commencing from the zeroed setting.

The branch rails 54 with attached tool modules 56 are automatically repositionable by the robot 12 using the configuration tool 14 and instructions executed by the controller 18. Accordingly, the tool branches 52 may be arranged as desired to permit the tool modules 56, or more precisely, the individual end tools 66 of the tool modules 56, to attach to or otherwise interact with a given workpiece. In a non-limiting body panel example, the corresponding end tools 66 as shown in the various figures are configured as pneumatic suction cups or grippers of the type commonly used to secure and move automotive or other body panels without marring cosmetic show surfaces. However, other end tools 66, such as pinchers, clamps, or spray nozzles may be used. Therefore, the particular construction of the end tools 66 may vary. In each tool branch 52, a swing arm 68 is coupled between the end tool 66 and the branch rail 54 by a swing arm lock mechanism 70 and the branch rail 54 is coupled to the crossbar 48 by a branch lock mechanism 74, as will be described in greater detail below.

The end-effector assembly 16 can be reconfigured to interact with workpieces having different sizes, shapes, and/or surface contours relative to each other and other workpieces, and constructed from different materials. For example, a workpiece may be considerably larger and more uniform than another workpiece, thereby requiring different configurations of the same end-effector assembly 16. Any number of possible workpieces may be encountered in a given manufacturing operation, and thus the end-effector assembly 16 is reconfigurable by the robot 12 to operate on any of them individually, as needed.

The controller 18 is made aware of the particular workpiece to be operated on via the input signals (arrow 30 of FIG. 1), such as via manual selection by an operator, detection of an RFID tag, or any other suitable identifying process. The controller 18 then automatically selects a corresponding configuration from its memory 22. After the end-effector assembly 16 has been deposited on the configuration stand 20 via the tool changer 64, the robot 12 then releases the end-effector assembly 16 via the tool changer 62 and moves to attach the configuration tool 14 at a suitable workstation to its wrist 42 or other suitable end linkage via another tool changer 142 mounted on the configuration tool 14 (see FIG. 7) so as to configure the end-effector assembly 16. Such a workstation may be embodied as a fixture that allows the configuration tool 14 to be retained at a calibrated position, i.e., a position readily accessible by the wrist 42. All of this occurs while the end-effector assembly 16 remains captive on the configuration stand 20. Furthermore, the present embodiment allows for the end-effector assembly 16 to be configured by the robot 12 without the need for any "flipping" on the configuration stand 20, as the lock/unlock features of the swing arm lock 70 and the branch lock 74 are accessible from the opposite direction of the end tools 66.

Once the end-effector assembly 16 has been fully configured for the task at hand using the configuration tool 14, the robot 12 automatically deposits the configuration tool 14 to its workstation, detaches the configuration tool 14 from the wrist 42 via releasing the tool changer 142 on the configuration tool 14, moves to pick up the newly configured end-effector assembly 16 by engaging the tool changer 62 and releasing the tool changer 64 at the same time, removes the end-effector assembly 16 from the configuration stand 20, and commences operation on a workpiece. The ability of the robot 12 to reconfigure the end-effector assembly 16, without flipping the end-effector assembly 16, allows for its use across a wide range of possible workpieces and in a variety of different environments, without concern for space limitation. In this way, manufacturing flexibility and efficiency can be enhanced, while reducing tooling costs and system downtime.

With continuing reference to FIG. 2, the end-effector assembly 16 includes at least one crossbar 48 arranged orthogonally with respect to the boom axis 50 of the main boom 44, with the various tool modules 56 connected with respect to the radially-extending branch rails 54. In an example embodiment in which the end tools 66 are pneumatic grippers, a flexible pneumatic hosing or dress assembly 400 may be routed along the main boom 44 and directed to the various end tools 66, as will be described in greater detail below.

With reference to FIG. 2 through FIG. 4B, each tool branch 52 includes a branch lock 74 telescopically securing the branch rail 54 to the crossbar 48. As shown, the branch rail is movably coupled to the crossbar by the branch lock 74. Each branch rail 54 has a driving groove 55 formed longitudinally therealong for telescopic movement relative to the crossbar 54. The branch lock 74 comprises a crossbar clamp 82 and a branch rail clamp 210.

In the depicted embodiment, the branch lock 74 can move between locked and unlocked crossbar states. In the locked crossbar state, the branch lock 74 fixes the position of the branch rail 54 relative to the crossbar 48 and, therefore, the branch rail 54 remains stationary relative to the crossbar 48. When the branch lock 74 is in the unlocked crossbar state, the branch rail 54 can translate along the crossbar 48 in the directions indicated by arrow 76 and can rotate around the crossbar 48 in the directions indicated by arrow 78.

In this manner, any number of different configurations of the tool modules 56 may be set by the robot 12 as needed in response to the commands (arrow 32) from the controller 18. As discussed in detail below, the configuration tool 14 can be used to move the branch lock 74 between the locked and unlocked crossbar states. Due to its rounded cross-section (e.g., circular cross-section), the crossbar 48 allows the branch lock 74 to rotate about the crossbar axis 80 when the branch lock 74 is in the unlocked crossbar state. In addition, the branch lock 74 can slide along the crossbar axis 80 when it is disposed in the unlocked crossbar state.

Also in the depicted embodiment, the branch lock 74 can telescopically move between locked and unlocked branch rail states. In the locked branch rail state, the branch lock 74 fixes the telescopic position of the branch rail 54 relative to the crossbar 48. When the branch lock 74 is in the unlocked branch rail state, the branch rail 54 can telescopically move relative to the crossbar 48 in the directions indicated by arrow 100. In this manner, any number of different telescopic configurations of the tool modules 56 may be set by the robot 12 as needed in response to the commands (arrow 32) from controller 18. As discussed in detail below, the positions tool 14 can be used to telescopically and slidably move the branch rail 54 between the locked and unlocked branch rail states. Due to its rounded cross-section (e.g. circular cross-section), the branch rail 54 can rotate about the branch rail axis 105 when the branch rail 54 is in the unlocked branch rail clamp state. In addition, the branch rail 54 can telescopically slide relative to the crossbar 48 when in the unlocked branch rail state.

Figure 4A:
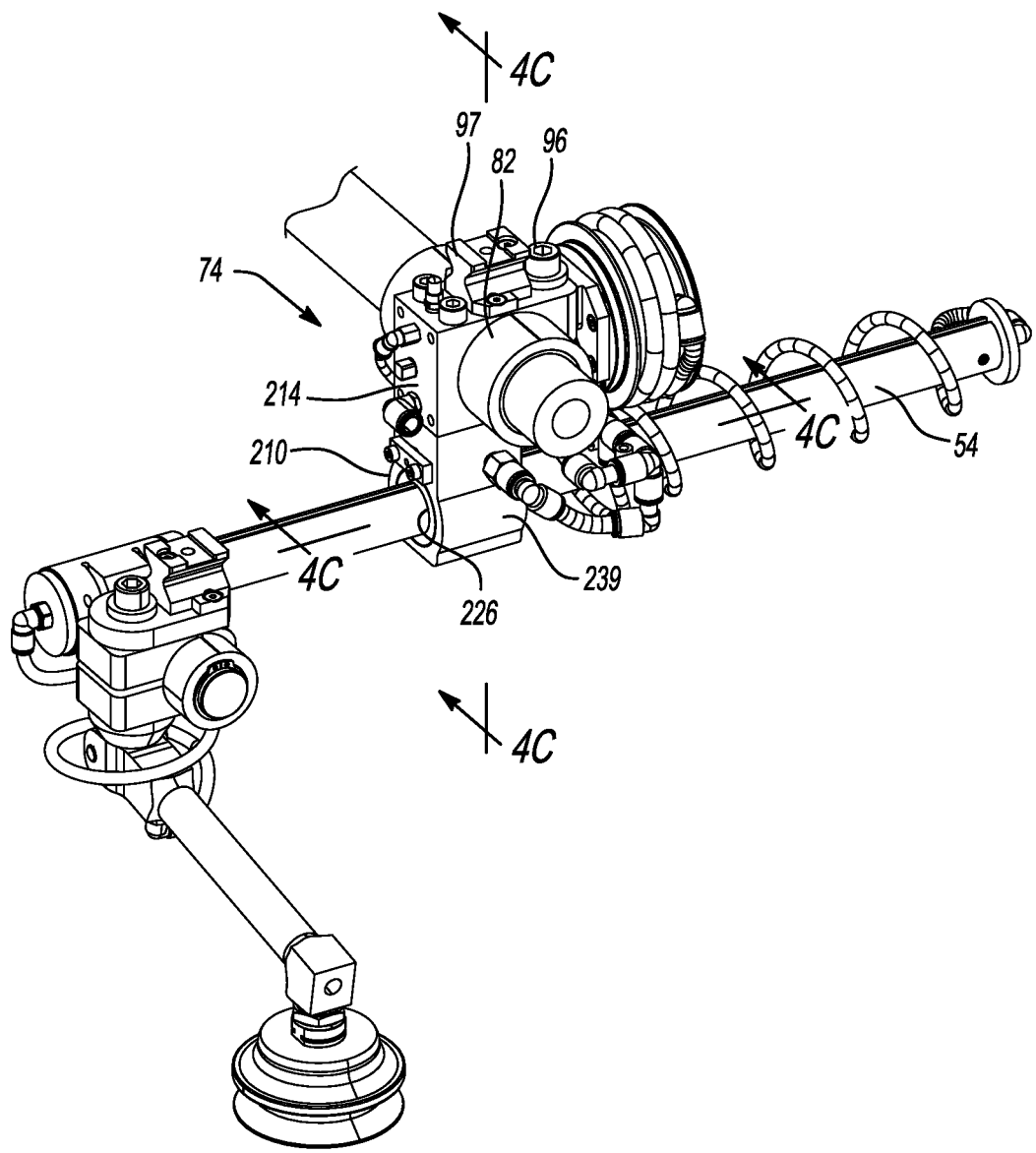
FIG. 4A is a perspective view of a branch lock of the end-effector assembly in accordance with one embodiment of the present disclosure.
Figure 4B:
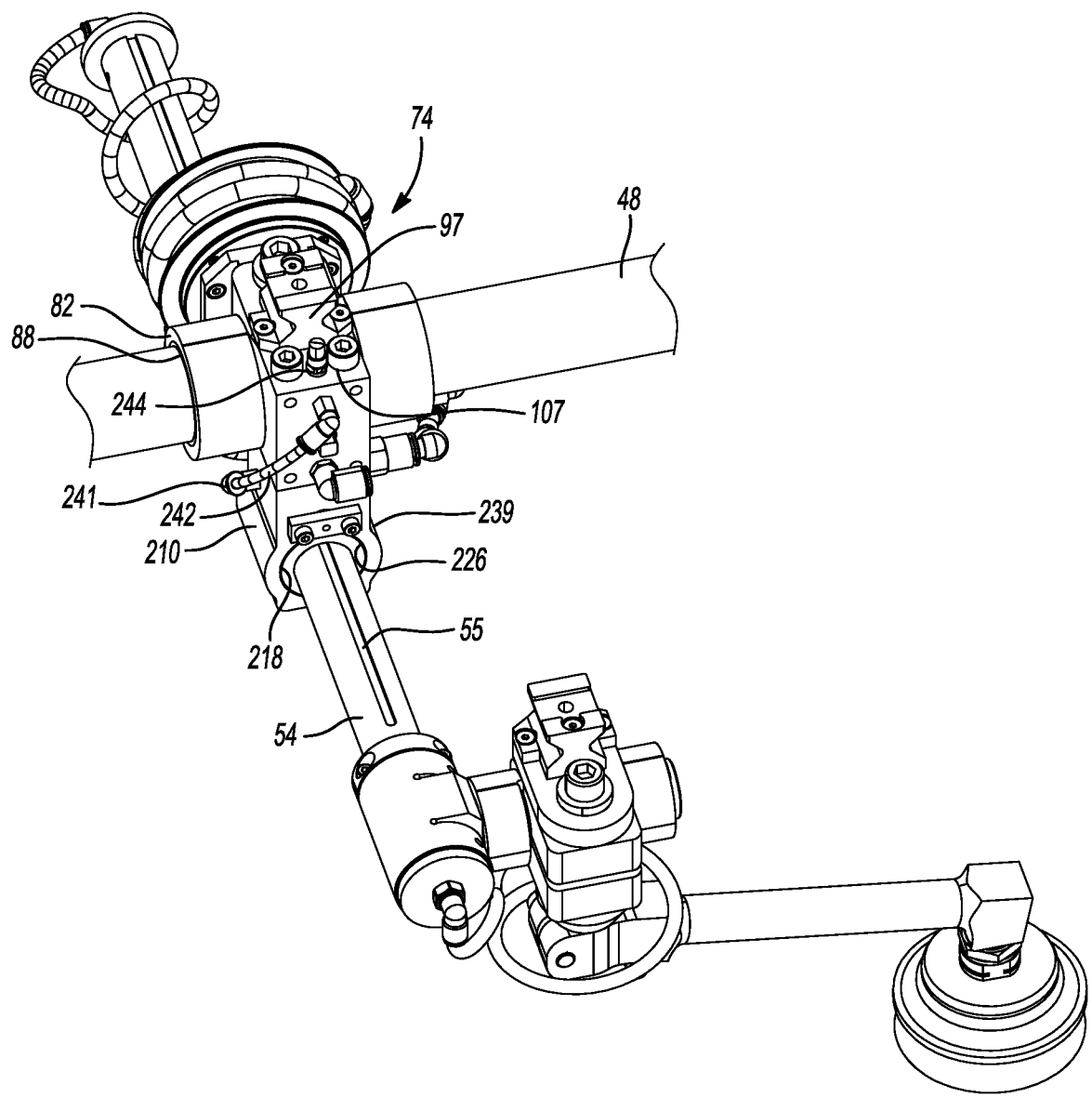
FIG. 4B is another perspective view of the branch lock of the end-effector assembly in FIG. 4A.
Figure 4C:
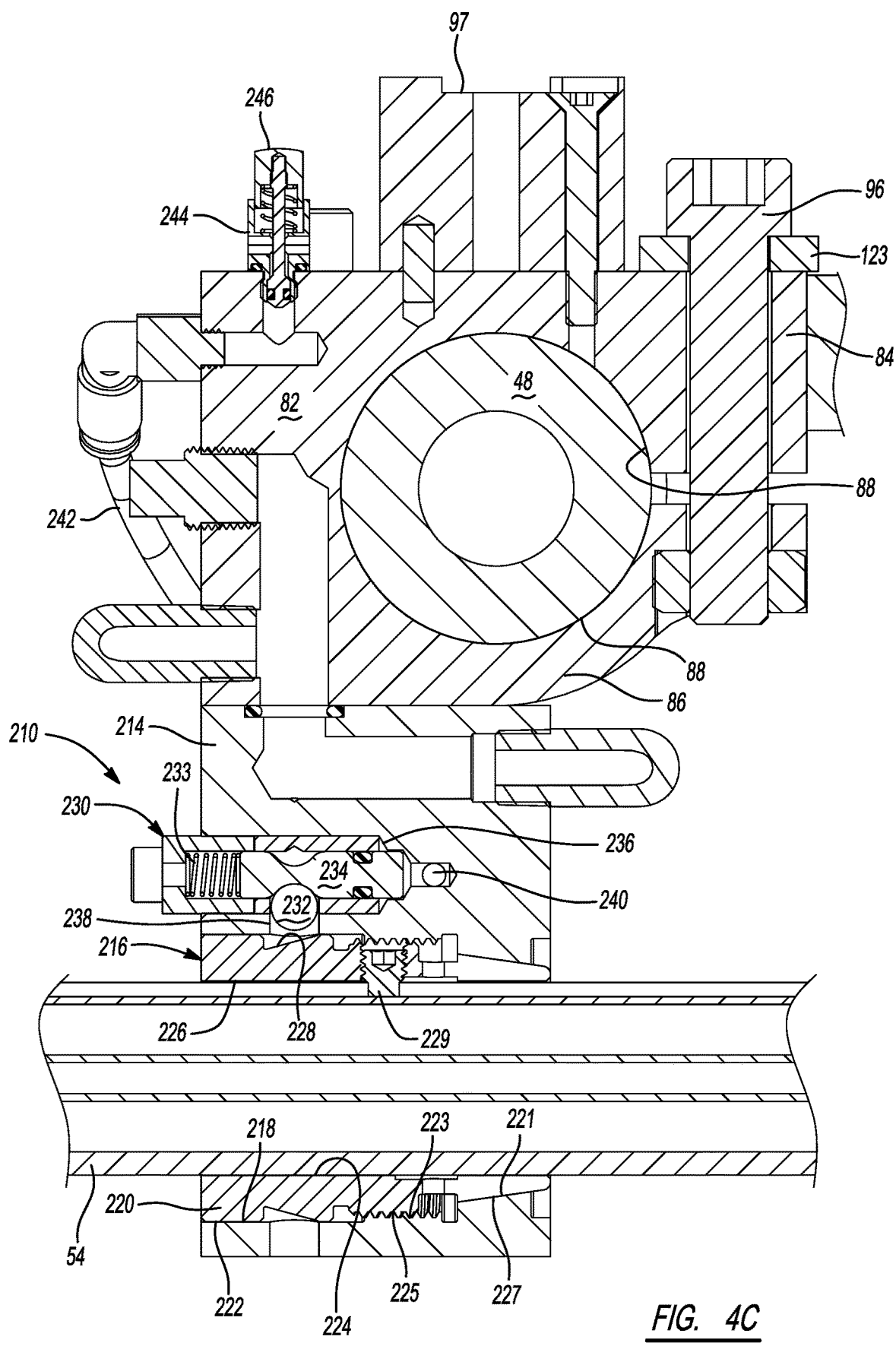
FIG. 4C is a cross-sectional view of a branch lock of the end-effector assembly, taken along section line 4-4 of FIG. 3.

In the depicted embodiment shown in FIGS. 4A-4C, the branch lock 74 includes a crossbar clamp 82 for clamping the crossbar 48, a lug 97 for engagement with the configuration tool 14, and a captured fastener 96 for tightening and releasing the branch lock 74. In particular, the crossbar clamp 82 is configured as a wrap-around clamp having a clamp arm 84 adjoined with a clamp base 86. The crossbar clamp 82 can be clamped and/or loosened on the crossbar 48 by pinching and/or releasing the clamp arm 84 and the clamp base 86. The crossbar clamp 82 defines a clamp recess 88 configured, shaped, and sized to receive a portion of the crossbar 48. The clamp recess 88 may have a concave shape in order to allow the crossbar 48 to seat on the clamp arm and base 84, 86.

A captured fastener 96 can be used to adjust the distance between the clamp arm 84 and the clamp base 86. As non-limiting examples, the fastener 96 may be a screw, a bolt, or any other suitable fastener for moving the clamp arm and base 84, 86 toward and away from each other.

As should be understood, rotating the fastener 96 causes the clamp arm 84 to move towards or away from the clamp base 86, thereby tightening or loosening the crossbar clamp 82 with respect to the crossbar 48. Specifically, rotating the fastener 96 in a first rotational direction (e.g., clockwise) locks the crossbar clamp 82, and rotating the fastener 96 in an opposite direction (e.g., counterclockwise) unlocks the crossbar clamp 82. When the crossbar clamp 82 is locked, the branch rail 54 is fixed with respect to the crossbar 48, and therefore, remains stationary relative to the crossbar 48. When the crossbar clamp 82 is unlocked, the branch rail 54 can translate and swing relative to the crossbar 48. The crossbar clamp 82 may also be configured as a two-part clamp with one hinge, a double-hinged three-part clamp, or any other suitable clamp design.

The branch lock 74 may further define a plurality of lugs or tabs 97 providing a feature for the configuration tool 14 to engage and adjust the branch lock 74, as will be described in greater detail below. At least one of the tabs 97 may incorporate a centering feature for use in alignment control by the robot 12. The branch lock 74 additionally includes an extension leg 500 for holding at least a portion of the flexible pneumatic dress assembly 400 (see, e.g., FIG. 3).

The branch rail clamp 210 comprises a first body 214 having a primary telescoping lock 216 and a secondary telescoping lock 230. The primary and secondary telescoping locks 216, 230 cooperate to lock or secure the branch rail 54 in a predetermined position relative to the crossbar 48. In the same manner, the primary and secondary telescoping locks 216, 230 cooperate to loosen the branch rail 54 relative to the crossbar 48. When the primary and secondary telescoping locks 216, 230 are loosened, the branch rail 54 is movable relative to the crossbar 48. That is, when loosened, the branch rail 54 is telescopically slidable along axis 105 depicted by movement arrow 100 and pivotable about axis 105 depicted by movement arrow 102.

As shown in FIGS. 4A-4C, the primary telescoping lock 216 comprises a receiving bore 218 formed therethrough with internal threads 225 in the middle as well as a wedging cavity 227 at the distal end and a wedging collet 220 disposed in the receiving bore 218. In this embodiment, the wedging collet 220 comprises a first outer wall 222 and a first inner wall 224 defining a branch hole 226 to receive one branch rail 54. Moreover, the first outer wall 222 has a locking ramp 228 formed thereabout, external threads 223 coupled to the internal threads 225 in the receiving bore 218 and slit taper wall 221 at the distal end. The first inner wall 224 has a drive pin 229 extending inwardly from the inner wall 224. Preferably, the drive pin 229 is disposed in the driving groove 55 of the branch rail 54.

As depicted in FIG. 4C, the first body 214 further comprises the secondary telescoping lock 230. As shown, the secondary telescoping lock 230 has a ball 232, a plunger 234 and a compression spring 233 disposed in a ball-plunger cavity 236 of the first body 214. The ball-plunger cavity 236 has a through hole 238 in fluid communication with the receiving bore 218. Moreover, the through hole 238 is in alignment with the locking ramp 228 of the wedging collet 220 when the primary telescoping lock 216 is in the locked state.

In this embodiment, the drive pin 229 and the branch rail 54 are in cooperating relationship such that the drive pin 229 engages with the branch rail 54 and the wedging collet 220 to tighten or loosen the primary telescoping lock 216 as well as to guide telescopic movement of the branch rail 54 relative to the crossbar 48.

The primary telescoping lock 216 can be unlocked by rotating the branch rail 54 counter-clockwise (viewed from the left hand side of FIG. 4C), which in turn drives the wedging collet 220 to also rotate in the same direction via the drive pin 229 coupling the wedging collet 220 to the branch rail 54. The rotation of the wedging collet 220 simultaneously causes the slit taper wall 221 of the wedging collet 220 to separate away from the wedging cavity 227 through the threaded coupling 223 and 225 between the wedging collet 220 and the receiving bore 218 in the first body 214 of the branch rail clamp 210. As such, the separation between the slit taper wall 221 of the wedging collet 220 and the wedging cavity 227 releases the wedging bind of the branch rail 54 to the wedging collet 220 and the wedging cavity in the first body 214 of the branch rail clamp 210. The primary telescoping lock 216 is thus unlocked or loosened and the branch rail 54 is free to slide telescopically to a desired radial position relative to the crossbar 48. To lock or tighten the primary telescoping lock 216, the branch rail 48 is rotated in the opposite or clockwise direction by the same amount of angle to drive or wedge the slit taper wall 221 of the wedging collet 220 in between the wedging cavity 227 and the branch rail 54 via the drive pin 229 and the threaded coupling 223 and 225 between the wedging collet 220 and the receiving bore 218 in the first body 214 of the branch rail clamp 210. All the aforementioned lock/unlock operation of the primary telescoping lock 216 can be carried out by manipulating the robot 12 with the configuration tool 14 engaging and moving the swing arm lock 70 still in the locked state.

In this embodiment, the ball 232 and the plunger 234 in the secondary telescoping lock 230 are in cooperating relationship such that the ball 232 is displaced in the through hole 238 and is engaged against the locking ramp 228 when the primary lock 216 is in the locked state and positive pneumatic pressure is placed in the ball-plunger cavity 236 via a cross hole 240, which is connected to a check valve 239 mounted on the outside of the first body 214 of the branch rail clamp 210. The positive pneumatic pressure also pushes the plunger 234 to cover up the top of the through hole 238 and thus trap the ball 232 in the space confined by the plunger 234, the through hole 238 and the locking ramp 228, which prohibits any movement of the wedging collet 220 inside the receiving bore 218. Engagement of ball 232 against the locking ramp 228 defines a secondary locked state, which prevents self-unlocking of the primary lock 216 due to unintended torque load or vibration on the branch rail 54 and the branch lock 74. That is, the primary lock 216 cannot be unlocked as long as the secondary lock remains in the locked state.

The check valve 239 only accepts and retains compressed air supplied from the robot 12 via the flexible pneumatic dress assembly 400. Therefore, the secondary telescoping lock 230 remains in the locked state once positive pneumatic pressure is placed inside the ball-plunger cavity 236. To change the secondary telescoping lock 230 into the unlocked state, the positive pneumatic pressure first has to be released by pressing a release button 246 on a relief valve 244, which is also connected to the ball-plunger cavity 236 via a tubing conduit 242 extending to a pneumatic port 241 on the side of the cross hole 240 opposite to the check valve 239. The relief valve 244 is installed near the lug 97 and on the same surface of the branch clamp 74 such that the release button 246 of the relief valve 244 can be activated to release the positive pneumatic pressure inside the ball-plunger cavity 236 by the configure tool 14 when the lug 97 of the branch clamp 74 is engaged. Accordingly, the ball 232 and the plunger 234 are in cooperating relationship such that the plunger 234 is pushed back by a compression spring 233 to its initial position opening up the top of the through hole 238, the ball 232 is thus free to return to the ball-plunger cavity 236 and can be disengaged from the locking ramp 228 when no pressure is placed in the ball-plunger cavity 236. Disengagement of the ball 232 from the locking ramp 228 defines a secondary unlocked state, which enables to primary telescoping lock 216 to be unlockable. Further, the branch rail 54 is telescopically moveable relative to the crossbar or crossbar 48 when the branch rail 54 are in the primary unlocked state and when the ball 232 and the plunger 234 are in the secondary unlocked state.

Moreover, regarding the primary telescoping lock 216, it is understood that, in at least one embodiment, for the configuration tool 14 to grasp the lug 97 on the swing arm lock mechanism 70 so as to rotate the branch rail 54 clockwise or counterclockwise for locking/tightening or unlocking/loosening the primary telescoping lock 216 as well as to slide the branch rail 54 in the telescoping lock 216 in the unlocked state.

Figure 5A:
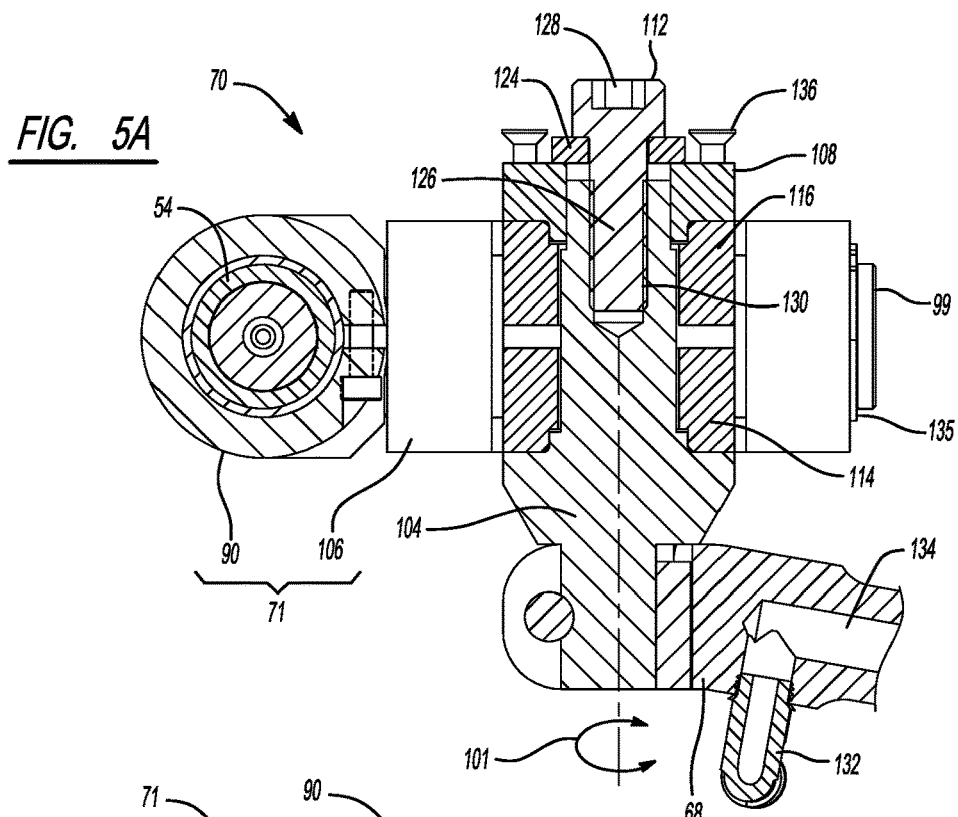
FIG. 5A is a cross-sectional view of a swing arm lock of the end-effector assembly, taken along section line 5-5 of FIG. 3.
Figure 5B:
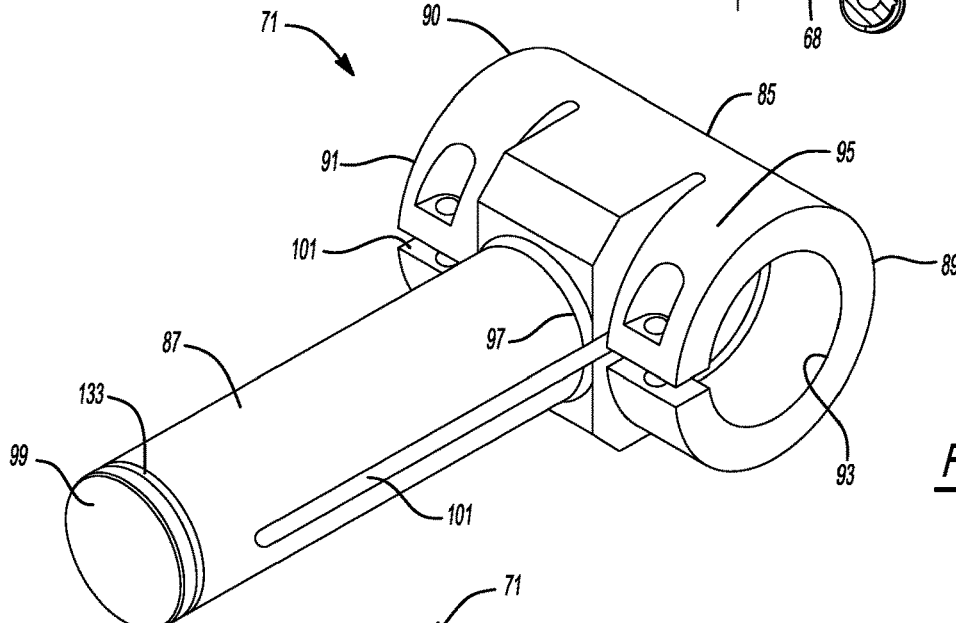
FIG. 5B is a perspective view of a roll clamp of the swing arm lock of the end-effector assembly.
Figure 5C:
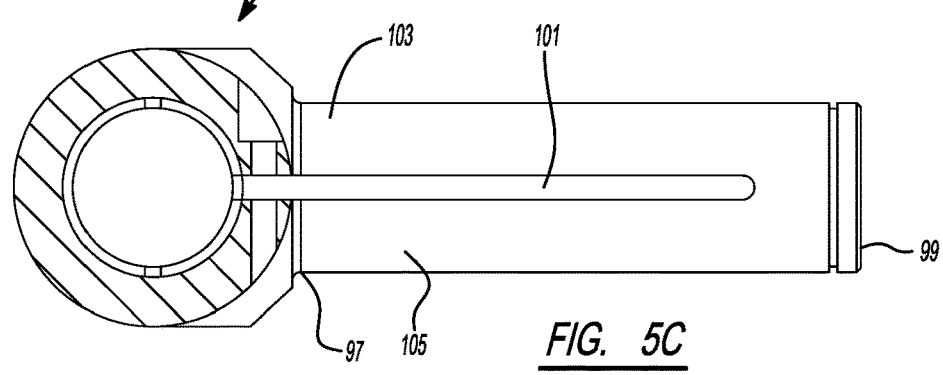
FIG. 5C is a cross-sectional view of the roll clamp of FIG. 5B taken along lines 5C-5C.

With continued reference to FIG. 2 and reference now to FIG. 5, the swing arm 68 is obliquely angled relative to the branch rail 54 in order to help the end tool 66 interact with a workpiece. In the depicted embodiment, the swing arm lock 70 can move between the locked and unlocked states. In the locked state, the swing arm lock 70 fixes the position of the swing arm 68 relative to the branch rail 54 and, therefore, the swing arm 68 remains stationary relative to the branch rail 54. When the swing arm lock 70 is in the unlocked state, the swing arm 68 can rotate about the branch rail 54 in the directions indicated by arrow 102, can rotate about a pivot shaft 104 (see FIG. 5) in the directions indicated by arrow 101, and can rotate about a tertiary axis 94 in the directions indicated by arrow 95. In this manner, any number of different configurations of the tool modules 56 may be set by the robot 12 as needed in response to the commands (arrow 32) from the controller 18. Due to its rounded cross-section (e.g., circular cross-section), the branch rail 54 allows the swing arm lock 70 to rotate about the branch rail axis 105 when the swing arm lock 70 is in the unlocked state. As discussed in detail below, the configuration tool 14 can be used to move the swing arm lock 70 between the locked and unlocked states.

Referring now to FIGS. 5A-5B, the swing arm lock 70 includes a clamp assembly 71 having a first wrap-around clamp (or roll clamp) 90 and a second wrap-around clamp (or pitch-yaw clamp) 106 for clamping the swing arm 68 to the branch rail 54. The swing arm lock 70 further includes a pivot shaft 104 for rotationally securing the swing arm 68 to the pitch-yaw or wrap-around clamp 106, a swing plate 108 for engagement with the configuration tool 14, and a locking fastener 112 for tightening and releasing the swing arm lock 70.

In this embodiment, the clamp assembly 71 is configured to movably secure the swing arm 68 to the branch rail 54. As discussed above, the clamp assembly 71 comprises a roll clamp 90 and a pitch-yaw clamp 106. The roll clamp 90 is rotatably secured to the branch rail 54. The branch rail 54 comprises a second body 85 and a roll shaft 87. The second body 85 has a first end 89 extending to a second end 91. The second body 85 further has an opening 93 formed through the first and second ends 89, 91 to define an outer wall 95 movably disposed about the branch rail 54. The roll shaft 87 has a proximal end 97 extending to a closed distal end 99 wherein the proximal end 97 is disposed on the outer wall 95 and extends radially outwardly therefrom to the distal end 99. When in the unlocked state, the roll clamp 90 may be rotatably movable about the branch rail 54 axis.

Preferably, the body 85 has a slot 101 formed through the outer wall 95 from the first and second ends, 89 and 91 respectively. As shown, the slot 101 is further formed through the proximal end 97 of the roll shaft 87 defining first and second split portions 103, 105 of the roll shaft 87 at the proximal end 97. The distal end 99 is closed. The pitch-yaw clamp 106 is movably secured about the roll shaft 87 between the proximal end 97 and the distal end 99 via the retaining ring 135 locked in the ring groove 133 on the roll shaft 87, and configured to lock and unlock the roll clamp 90 to the branch rail 54. As shown, in this example, the slot 101 on the roll shaft 87 is formed from the proximal end 97 to a length along the roll shaft.

As will be discussed in greater detail below, the swing arm lock 70 further comprises a pivot shaft 104 extending through the clamp assembly 71 and configured to rotationally secure the clamp assembly in place. The swing arm lock 70 further includes a swing plate 108 secured to the pivot shaft 104 and configured for engagement with a configuration tool. The swing arm lock 70 further comprises a locking fastener 112 extending through the swing plate 108 and into the pivot shaft 104. The locking fastener 112 is configured to lock and unlock the pitch-yaw clamp 106 about the roll shaft 87, thereby locking and unlocking the roll clamp 90 to the branch rail 54.

Figure 6:
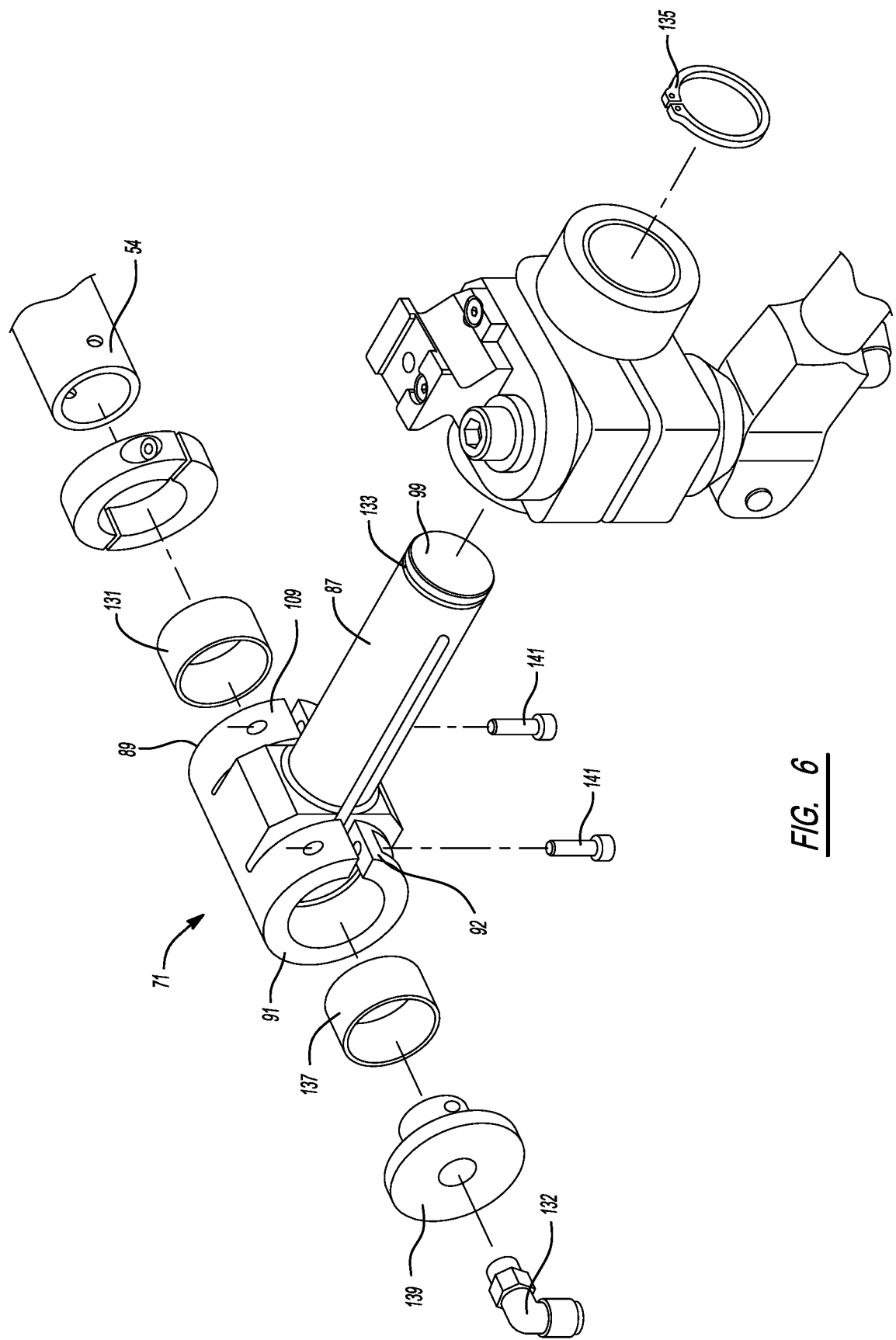
FIG. 6 is a cross-sectional view of a swing arm lock of the end-effector assembly.

In this embodiment, as shown in FIG. 6, the first end 89 of the roll clamp 90 comprises a first bearing bushing 131 mounted inside a first bushing collet 109. the first bushing collet 109 can be locked by fasteners 141. The second end 91 has a second bearing bushing 137 mounted inside a second bushing collet 92. the second bushing collet 92 can be locked by fasteners 141. On the side of the second end 91, an endcap 139 is attached to the distal end of the branch rail 54 serving as a hard stop of sliding movement of the roll clamp 90 on the branch rail 54 in addition to being a connection of pneumatic fittings 132.

In this embodiment, the pitch-yaw clamp 106 can be clamped and/or loosened by pinching and/or releasing a pair of split flanges (i.e., split flange base 114, split flange arm 116) over the roll shaft 87 of the roll clamp 90, which is, in turn, secured over the branch rail 54. It is to be understood that the slot on the roll clamp 90 defines the proximal end having a pair half-rounded, proximal split ends 103, 105 of the roll shaft 87 which, in turn, allows the roll clamp 90 to be pinched thereby securing the swing arm lock 70 over the branch rail 54. As shown, the slot 101 extends from the proximal end 97 to a length along the roll shaft 87 and terminates away or adjacent from the distal end 99. Thus, the distal end 99 of the roll shaft 87 is closed, providing enhanced securement to the branch rail 54 and robustness to the clamp assembly 71.

As previously discussed, the swing arm 68 may carry the end tools 66. The swing arm 68 may be tightened to the pitch-yaw clamp 106 when in the locked state, but is free to rotate with the fastened pivot shaft 104 when in the unlocked state. To this end, the pivot shaft 104 may extend through openings in the split flange base 114 and split flange arm 116 and terminate at the swing plate 108. The locking fastener 112 can movably couple the split flange base 114 to the split flange arm 116. As non-limiting examples, the locking fastener 112 may be a screw, a bolt, or any other suitable fastener including external threads. In the depicted embodiment, for example, the locking fastener 112 is a captured fastener secured within the swing plate 108 via a retaining ring 124. In this way, when unclamping, the locking fastener 112 freely spins, but the pivot shaft 104 may be pushed away axially to loosen the swing arm lock 70 instead of causing the captured fastener 112 to push back the configuration tool 14.

The locking fastener 112 further includes a lock shaft 126 and a head 128 coupled to the lock shaft 126. The head 128 is arranged to protrude from the swing plate 108, while the lock shaft 126 is partially disposed in a blind hole 130 extending through the pivot shaft 104. The blind hole 130 of the pivot shaft 104 is internally threaded and is configured, shaped, and sized to mate with an external thread of the lock shaft 126. As a result, rotating the locking fastener 112 causes the split flange base 114 and the split flange arm 116 to move together or apart, thereby tightening or loosening the first and second wrap-around clamps 90, 106 with respect to the branch rail 54 and the swing arm 68, concurrently. Specifically, rotating the locking fastener 112 in a first rotational direction (e.g., clockwise) threads the locking fastener 112 into the pivot shaft 104 and locks the pitch-yaw clamp 106, while rotating the locking fastener 112 in an opposite direction (e.g., counterclockwise) unthreads the locking fastener 112 from the pivot shaft 104 and unlocks the pitch-yaw clamp 106.

In addition, at least one pneumatic fitting 132 may be coupled to the swing arm 68 in order to fluidly couple the flexible pneumatic dress assembly 400 to the end tools 66 arranged on the swing arm 68. The pneumatic fitting 132 may be in fluid communication with a fluid passage 134 formed through the swing arm 68. The swing plate 108 may further define a plurality of lugs or tabs 97 providing a feature for the configuration tool 14 to engage and adjust the pitch-yaw clamp 106, as will be described in greater detail below. At least one of the lugs or tabs 97 may incorporate a centering feature for use in alignment control by the robot 12.

Figure 7:
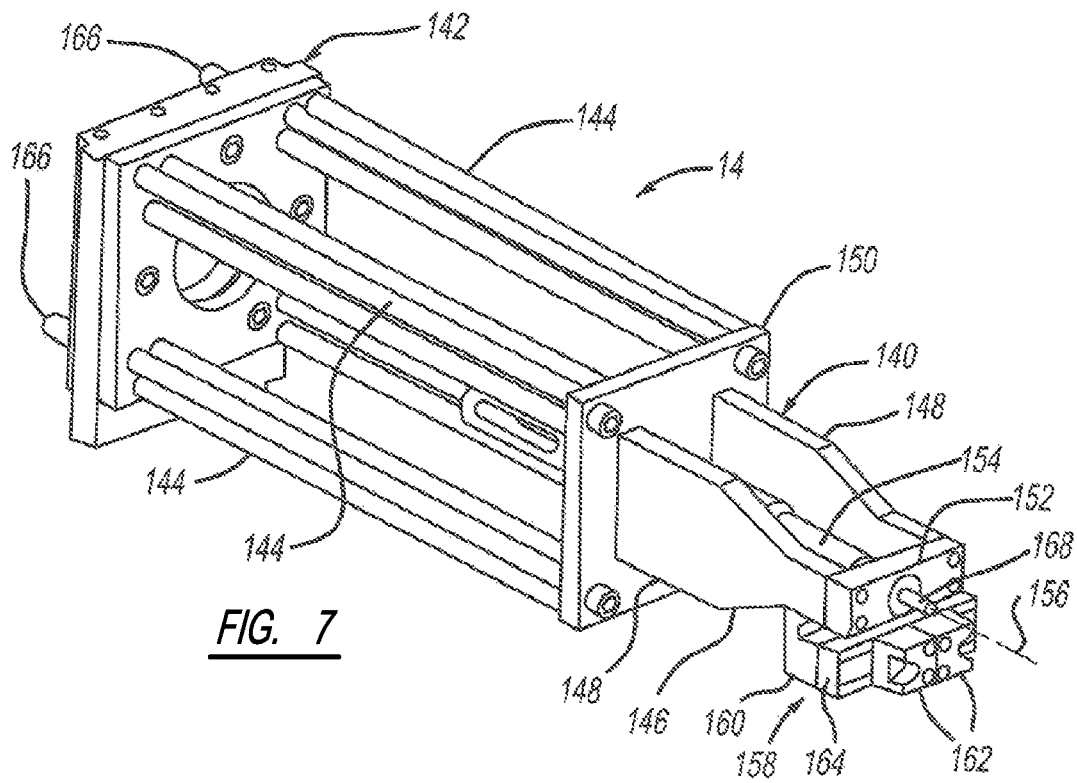
FIG. 7 is a perspective view of a configuration tool usable as part of the robotic system of FIG. 1, with a gripper depicted in a disengaged state.
Figure 8:
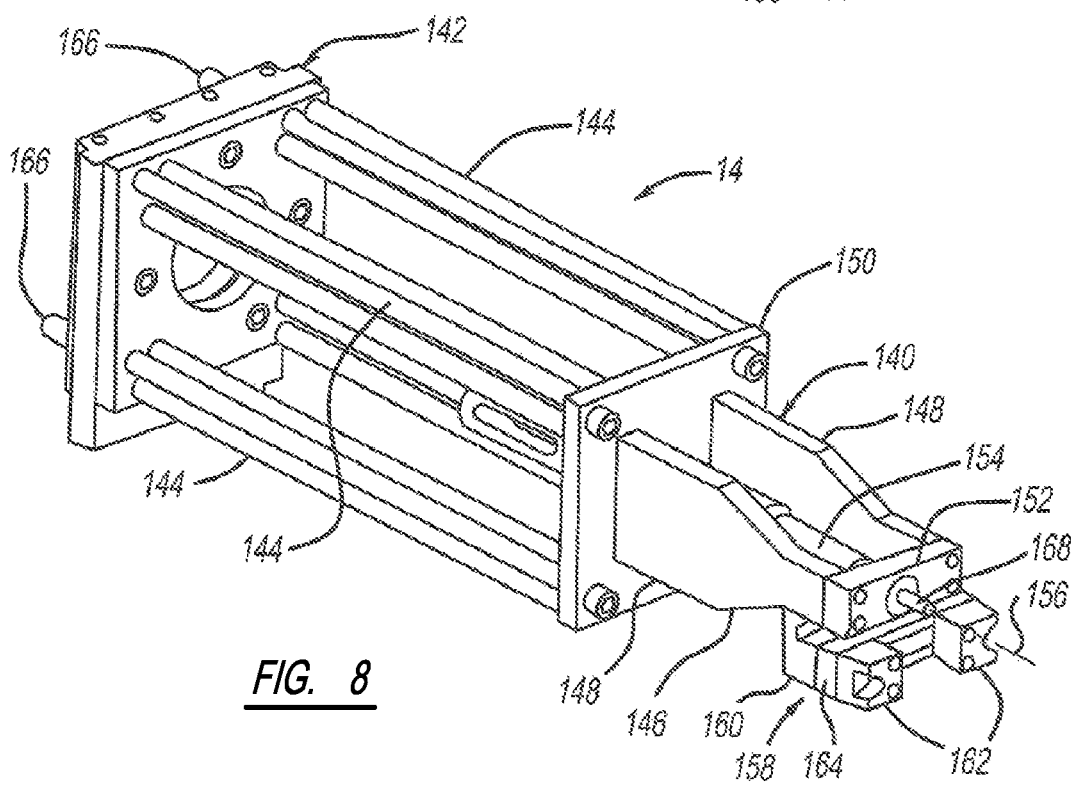
FIG. 8 is a perspective view of the configuration tool usable as part of the robotic system of FIG. 1, with the gripper finger depicted in an engaged state.

With specific reference to FIG. 7 and FIG. 8, the configuration tool 14 includes an axially-extending tool assembly 140 and the tool changer 142 coupled to the tool assembly 140 via axially-extending support rails 144. The tool assembly 140 includes a tool body 146, which may include parallel plates 148 each shaped as a rectangle or another polygon. Each parallel plate 148 is mounted to (and extends from) a first end plate 150 toward a second end plate 152. The first and second end plates 150, 152 are part of the tool body 146 and may be rectangular in shape. The first end plate 150 may be larger in area than the second end plate 152 to facilitate use in configuring the end-effector assembly 16.

A nutrunner 154 can rotate about a nutrunner axis 156 (i.e., bit axis) and extends through the second end plate 152 and is used to adjust the swing arm lock 70 and the branch lock 74. In the present disclosure, the term "nutrunner" means a powered torque wrench capable of using pneumatic, electric, or hydraulic power to rotate and transmit torque. The nutrunner 154 may be driven with a servo motor and control for precise and consistent rotation.

In addition, the tool assembly 140 includes a gripper 158 coupled to the tool body 146 at a location closer to the second end plate 152 than to the first end plate 150. The gripper 158 includes a gripper actuator 160 and a plurality of gripper fingers 162 movably coupled to the gripper actuator 160. The gripper actuator 160 can be an electric or pneumatic actuator, and the tool changer 142 can channel electricity or pneumatic fluid for controlling the gripper 158 when the configuration tool 14 is mounted to the wrist 42. In the depicted embodiment, the gripper 158 includes two fingers 162. However, the gripper 158 may include more than two fingers 162. Irrespective of the quantity, for one configuration of the lug or tab 97, the gripper fingers 162 can move relative to one another between a first or disengaged position (FIG. 7) and a second or engaged position (FIG. 8). For another configuration of the lug or tab 97, the first position can be engaged, while the second position disengaged. When disposed in the first position (FIG. 7), the gripper fingers 162 are closer to each other than in the second position (FIG. 8). The gripper fingers 162 may be coupled to the gripper actuator 160 via a sliding member 164. The sliding member 164 is coupled to the gripper fingers 162 and can be actuated by the gripper actuator 160 in order to move the gripper fingers 162 between the first and second positions.

The gripper fingers 162 of the gripper 158 are configured to grasp the lugs 97 of the branch lock 74 in order to hold the branch lock 74, thereby allowing the configuration tool 14 to move (translate or rotate) the tool branch 52 relative to the crossbar 48. In particular, to release the branch lock 74, the configuration tool 14 is robotically commanded to grasp the lug 97, then the nutrunner 154 turns the locking fastener 96 counter-clockwise to push the clamp base 86 away from the clamp arm 84 of the crossbar clamp 82, and thus unlock the tool branches 52 from the crossbar 48. In turn, this allows the robot 12 to slide and rotate the tool branches 52 around the crossbar 48 along the crossbar axis 80 for moving the end tools 66 to the desired position. Similarly, to lock the branch lock 74 upon reaching a desired position, and while the configuration tool 14 is still engaged, the nutrunner 154 turns the locking fastener 96 clockwise to pull in the clamp base 86 and the clamp arm 84 of the crossbar clamp 82 to pinch over the crossbar 48 and thereby securely lock the tool branches 52 of the end effector 16 in a desired configuration. As these steps can be performed with the reconfiguration tool 14 remaining engaged with the branch lock 74, cycle time for reconfiguration can be reduced.

Similarly, the gripper fingers 162 of the gripper 158 can grasp the lugs 97 of the swing arm lock 70 in order to hold the swing plate 108, thereby allowing the configuration tool 14 to move the tool module 56 relative to the branch rail 54. In particular, to release the swing arm lock 70, the configuration tool 14 is robotically commanded to grasp the swing plate 108 on the lugs 97, then the nutrunner 154 turns the locking fastener 112 counter-clockwise to push the pivot shaft 104, and thus the swing arm 68. In turn, this allows the robot 12 to slide and rotate the tool module 56 around the branch rail 54 along the branch rail axis 105 by arrow 102, as well as to swing and tilt the swing arm 68 about the axis of the pivot shaft 104 by arrow 101 and the tertiary axis 94 by arrow 95, respectively in combination for moving the end tools 66 to the desired position. Similarly, to lock the swing arm 68 upon reaching a desired position, and while the configuration tool 14 is still engaged, the nutrunner 154 turns the locking fastener 112 clockwise to pull in the pivot shaft 104 and the swing arm 68 together to thereby lock the swing arm 68 in a desired configuration. In turn, this pinches the split flanges 114, 116 of the pitch-yaw clamp 106 over the roll shaft 87 including the upper and lower proximal split ends 103, 105 of the roll clamp 90 and, in turn, over the branch rail 54, thereby securely locking the end-effector assembly 16 into position. As these steps can be performed with the reconfiguration tool 14 remaining engaged with the swing arm lock 70, cycle time for reconfiguration can be reduced.

The tool changer 142 of the configuration tool 14 may be any suitable mechanical coupling, similarly to the tool changer 62 on the master boom 44, allowing the robot 12 to pick up the configuration tool 14 and includes guide pins 166 or other suitable coupling devices which enable the robot 12 to engage the configuration tool 14 with the wrist 42. The tool changer 142 may also include electrical and pneumatic ports capable of channeling electric and pneumatic power and control signals to run the nutrunner 154 via a drive motor inside the nutrunner 154. Once coupled to the wrist 42, the configuration tool 14 locks into place and electrical and/or pneumatic power is provided to the nutrunner 154 as needed to rotate the driver bit 168, e.g., a hex-head bit. Thus, actuating the nutrunner 154 causes the driver bit 168 to turn. At least part of the nutrunner 154 extends through the second end plate 152 in a direction away from the first end plate 150, such that the driver bit 168 is outside the tool body 146 and extends beyond the second end plate 152.

Referring to FIG. 9 and FIG. 10, in order to reconfigure the tool branch 52, the configuration tool 14 is manipulated first to engage the nutrunner 154 and its driver bit 168 with the fastener 96 of the branch lock 74 that wraps around on the crossbar 48, while the gripper fingers 162 on the configuration tool 14 remain in the first position (i.e., disengaged state) but in a position that is ready to engage with at least one of the lugs 97. Specifically, the robot 12 moves the configuration tool 14 toward the branch lock 74 such that the driver bit 168 is aligned with the fastener 96 and the gripper fingers 162 of the gripper 158 are aligned with at least one of the lugs 97, while the gripper fingers 162 are in the first position (i.e., disengaged state). The configuration tool 14 may be moved toward the branch lock 74 until the driver bit 168 is aligned with the fastener 96 and the gripper fingers 162 are aligned with at least one of the lugs 97. Then, as best shown in FIG. 10, the gripper fingers 162 are then moved to the second position (i.e., engaged state) in order to grasp at least one of the lugs 97. As discussed above, the gripper fingers 162 can be actuated pneumatically or electrically.

Next, the controller 18 electrically commands the nutrunner 154 to engage the driver bit 168 with the fastener 96. The driver bit 168 may rotate (e.g., counter-clockwise) to loosen the fastener 96 and release the branch lock 74 from secure engagement on the crossbar 48. With the gripper fingers 162 of the configuration tool 14 grasping tightly on the at least one of the lugs 97, the robot 12 can slide and rotate the tool branches 52 along the crossbar 48. Afterwards, the nutrunner 154 of the configuration tool 14 is commanded (by the controller 18) to rotate (e.g., clockwise) to tighten the fastener 96 to secure the branch lock 74 in the desired position on the crossbar 48. The controller 18 can also command the gripper fingers 162 to disengage (i.e., move to the first position) in order to release the at least one of the lugs 97 and disengage the configuration tool 14 from the branch lock 74 to complete the reconfiguration operation.

Figure 11:
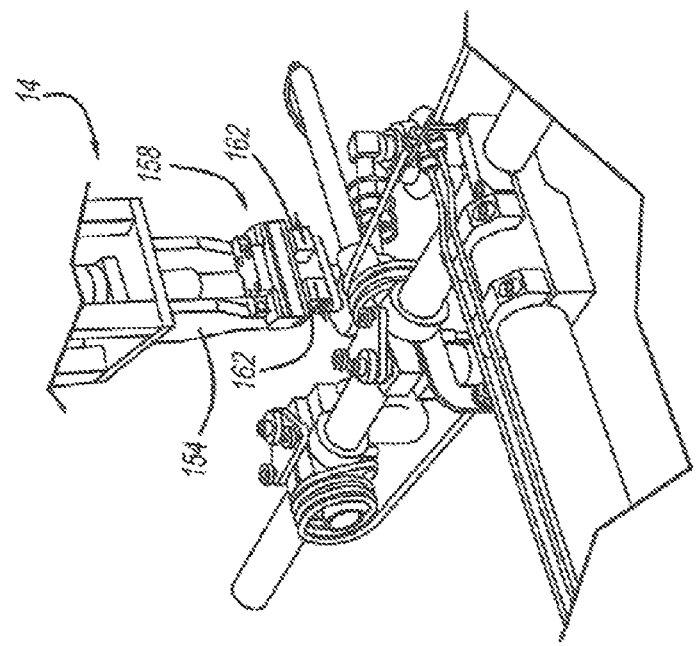
FIG. 11 is a perspective view of the configuration tool moving toward a swing arm lock of the end-effector assembly.
Figure 12:
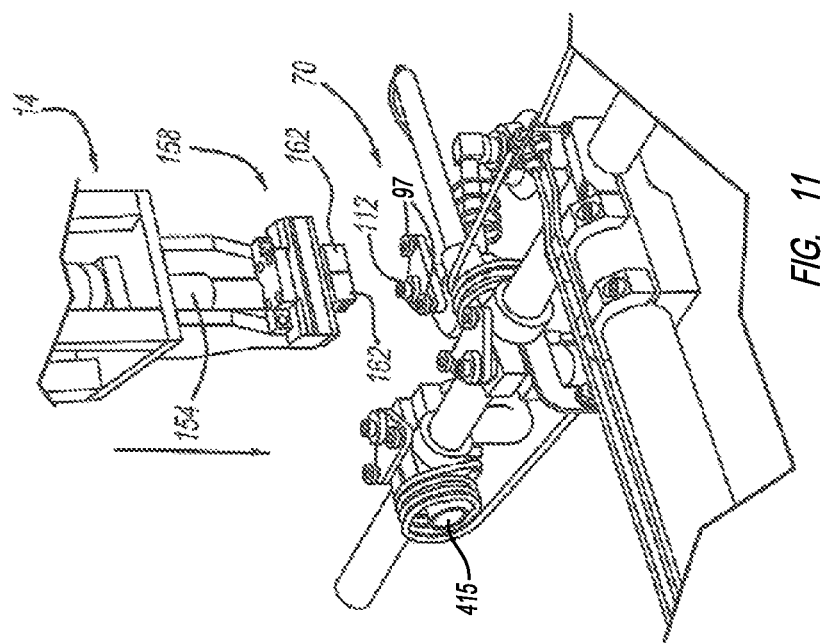
FIG. 12 is a perspective view of the configuration tool coupled to the swing arm lock of the end-effector assembly.

With reference now to FIG. 11 and FIG. 12, in order to configure the swing arm 68 or adjust the position and/or orientation of the end tool 66 (e.g., vacuum gripper), the configuration tool 14 may be manipulated to engage the nutrunner 154 and its driver bit 168 with the locking fastener 112 of the swing arm lock 70, while the gripper fingers 162 on the configuration tool 14 remain disengaged (i.e., in the first position) but in a position that is ready to engage with the locking fastener 112. Specifically, the robot 12 moves the configuration tool 14 toward the swing arm lock 70 such that the driver bit 168 is aligned with the locking fastener 112 and the gripper fingers 162 of the gripper 158 are aligned with at least one of the lugs 97, while the gripper fingers 162 are in the first position (i.e., disengaged state). The configuration tool 14 may be moved toward the swing arm lock 70 until the driver bit 168 is aligned with the head of the locking fastener 112 and the gripper fingers 162 are aligned with at least one of the lugs 97. Then, as best shown in FIG. 12, the gripper fingers 162 are engaged (i.e., moved to the second position) in order to grasp at least one of the lugs 97. As discussed above, the gripper fingers 162 can be actuated pneumatically or electrically.

Next, the controller 18 electrically commands the nutrunner 154 to engage the driver bit 168 with the locking fastener 112. The driver bit 168 may rotate (e.g., counter-clockwise) to loosen or push the locking fastener 112 from the pivot shaft 104. This action, in turn, releases the swing arm lock 70 from secure engagement on the branch rail 54, while concurrently allowing the swing arm 68 to move with respect to the swing arm lock 70. With the gripper fingers 162 of the configuration tool 14 grasping tightly on the at least one of the lugs 97, the robot 12 can rotate the swing arm 68 along the branch rail 54, as well as, tilt the swing arm 68 around the roll shaft 87 including the upper and lower proximal split ends 103, 105 of the roll clamp 90 to the desired position or orientation. Additionally, the robot 12 can also rotate the swing arm 68 and the end tool 66 (e.g., vacuum gripper) around the axis of the pivot shaft 104. Afterwards, the nutrunner 154 of the configuration tool 14 is commanded (via the controller 18) to rotate (e.g., clockwise) to tighten the locking fastener 112 to secure the swing arm lock 70 in the desired position on the branch rail 54, as well as, to secure the swing arm 68 in the proper orientation with respect to the swing arm lock 70. Then, the controller 18 can also command the gripper fingers 162 to disengage (i.e., move to the first position) to release the lugs 97 and disengage the configuration tool 14 from the swing arm lock 70 to complete the reconfiguration operation.

Figure 13:
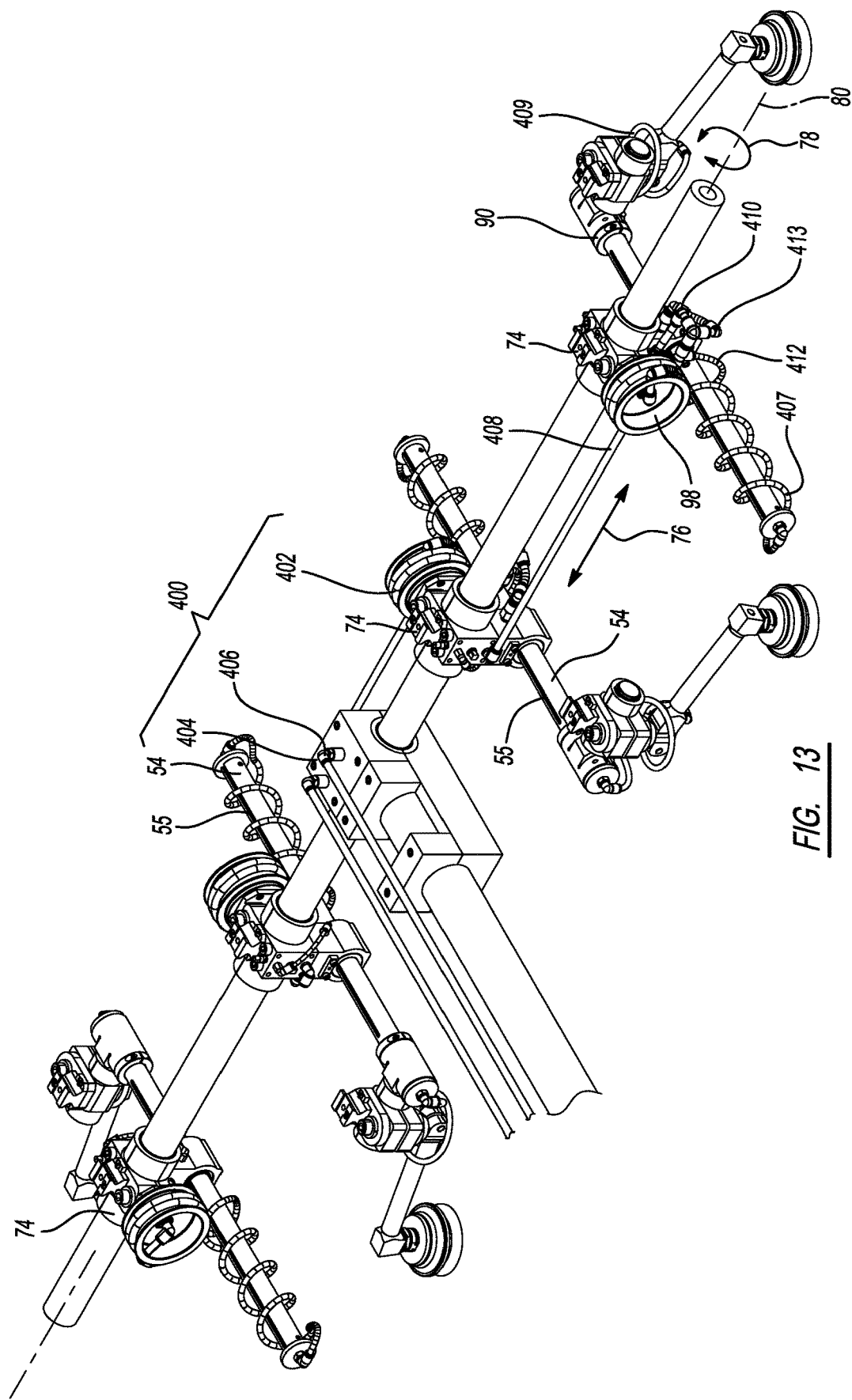
FIG. 13 is a perspective view of a flexible pneumatic dress assembly for use the end-effector assembly of FIG. 1.

With reference now to FIG. 2 and FIG. 13, the flexible pneumatic dress assembly 400 is disclosed for use with the end-effector assembly 16 for channeling gas (e.g., air) from the robot 12 and into or out of the end tools 66 (e.g., vacuum gripper). In particular, the pneumatic dress assembly 400 includes a plurality of coiled or helical pneumatic tubing 402 arranged at various positions along the plurality of tool branches 52, a main manifold 404 secured to the master boom 44, and a plurality of pneumatic fittings 406 arranged between the main manifold 404 and the tubing 402. In the example embodiment described above in which the end tools 66 are pneumatic grippers, various sized pneumatic tubing may be used to transmit pneumatic air or vacuum from the robot 12 through the tool changer assembly 60 and to the end tools 66 of the end-effector assembly 16. The routing of the coiled or helical tubing 402 takes advantage of the recoil capability of the tubing 402 such that the tubing 402 can stretch and collapse manner to its defined geometry and shape as the tool branches 52 are reconfigured.

The flexible pneumatic dress assembly 400 may be routed along the master boom 44 to establish the main manifold 404 between the master boom 44 and the crossbar 48. The main manifold 404 may further include a pair of the pneumatic fittings 406 extending in either direction along the crossbar 48. The remaining fittings 406 and tubing 402 are interconnected in a daisy-chain connection from the main manifold 404 to neighboring tool branches 52 and directed to the various end tools 66. In particular, each branch lock 74 incorporates its own helical tubing 402 arrangement therearound, as best shown in FIG. 13. Each helical tubing 402 may be coiled near the proximal end of the branch lock 74 for several turns. As the branch lock 74 is moved, the helical tubing 402 may be stretched or to recoil back. Each tubing 402 may have a single input 408 and three outputs 410, 412, 413. The single input 408 may be interconnected with the fittings 406 of the main manifold 404 or of a preceding branch lock 74. The first output 410 may interconnect with an additional branch lock 74 along the crossbar 48, if any. The second output 412 may be routed to the hollow inner of the branch rail 54 with a helical tubing 407. The helical tubing 407 may also interconnect with the end tool 66 via a smaller helical tubing 409 coiled around the swing arm lock 70 for several turns and terminated at a pneumatic fitting 411 on the swing arm 68 near the pivot shaft 104. The fitting 411 has an air passage connecting to the hollow inner 134 of the swing arm 68, which is employed directly as pneumatic conduit to the end tools 66. The second output 412 may be routed to the check valve 239 of the secondary telescoping lock 230 on the first body 214 of the branch clamp 210, which is part of the branch lock 74.

Figure 14:
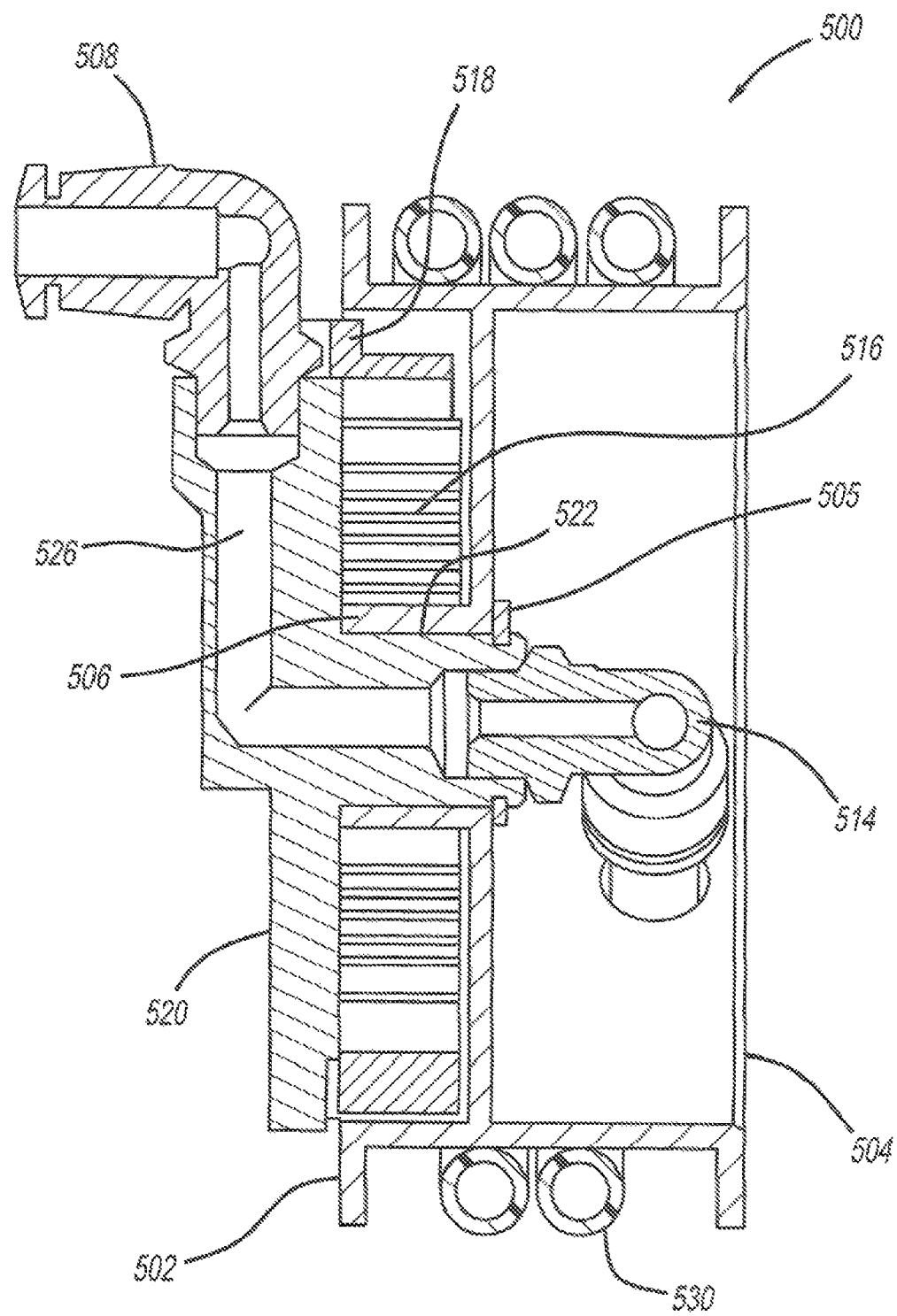
FIG. 14 is a cross-section view of a spring-loaded tubing reel, an alternative to the helical tubing of FIG. 13.

Referring to FIG. 14, another exemplary flexible pneumatic dress assembly 500 incorporates a spring-loaded tubing reel 502 in lieu of the simple helical tubing 402. The tubing reel 502 can, advantageously, stretch and/or collapse tubing in an actively defined geometry and shape rather than relying passively on the recoil capability of the tubing material.

The spring-loaded tubing reel 502 includes a drum 504 having a hub 506. The reel 502 is coupled to a shaft 522 of a reel support 520. The drum 504 and the reel support 520 are assembled and held together with a retaining ring 505. A spiral-shaped power spring 516 is installed between the drum 504 and the reel support 520. The inner end of the power spring 516 is fixedly secured to the hub 506 of the drum 504, while the outer end of the power spring 516 is secured to a spring cover 518. The spring cover 518 is, in turn, fastened to the reel support 520 with a fastener (e.g., screw, bolt) after the installation of the power spring 516.

While the reel support 520 is secured to the rear protrusion 415 of the branch lock 74 via an adapter plate (not shown) with plurality of fasteners (e.g. bolts, screws), the drum 504 is free to rotate with the winding of power spring 516. The reel support 520 also has a hollow core 526 functioning as a pneumatic conduit having a first end connected to a pneumatic fitting 508 and a second, opposing end connected to another pneumatic fitting 514. The second fitting 514 accepts tubing 530 coiled on the drum 504. The fitting 514 may swivel freely to accommodate the rotation of the drum 504 resulting from stretching or collapsing of the tubing 530 during the robotic movement of the branch locks 74 for end-effector reconfiguration. The power spring 516 assists in maintaining the tubing 530 in tension, and due to the tension, retaining features may not be required.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. An end-effector assembly comprising:
   a master boom;
   a crossbar coupled to the master boom;
   at least one branch rail movably coupled to the crossbar by a branch lock, the at least one branch rail having a driving groove formed longitudinally therealong for telescopic movement relative to the crossbar, the at least one swing branch comprising:
   a crossbar clamp slidably and pivotally disposed about the crossbar for slidable and pivotal movement therealong, the crossbar clamp having a clamp arm adjoined with a clamp base defining a clamp recess through which the crossbar is disposed, the clamp arm and clamp base being cooperable to secure and loosen about the crossbar allowing for slidable and pivotal movement therealong;
   a branch rail clamp comprising a body having a primary telescoping lock comprising a receiving bore formed therethrough with internal threads in the middle as well as a wedging cavity at the distal end and a wedging collet disposed in the receiving bore, the wedging collet comprising an outer wall and an inner wall defining a branch hole to receive one branch rail, the outer wall having a locking ramp formed thereabout, external threads coupled to the internal threads in the receiving bore and slit taper wall at the distal end, the inner wall having a drive pin extending inwardly therefrom and disposed in the driving groove of the branch rail, the body comprising a secondary telescoping lock having a ball, a plunger and a compression spring disposed in a ball-plunger cavity of the body, the ball-plunger cavity having a through hole in fluid communication with the receiving bore and in alignment with the locking ramp of the wedging collet; and a swing arm movably coupled to the at least one branch rail by a swing arm lock, wherein the wedging collet and the wedging cavity are in cooperating relationship such that the slit taper wall of the wedging collet engages with the wedging cavity via the thread-in movement of the wedging collet driven by the clockwise rotation of the branch rail through the coupling of the drive pin to prevent telescopic movement of the branch rail relative to the crossbar, defining a primary locked state, and wherein the wedging collet and the wedging cavity are in cooperating relationship such that the slit taper wall of the wedging collet disengages from the wedging cavity via the thread-out movement of the wedging collet driven by the counter-clockwise rotation of the branch rail through the coupling of the drive pin to allow telescopic movement of the branch rail relative to the crossbar, defining a primary unlocked state.

2. The end-effector assembly of claim 1 wherein the ball and the plunger are in cooperating relationship such that the ball is displaced and closed in the through hole by the plunger and is engaged against the locking ramp when positive pressure is placed in the cavity, defining a secondary locked state, and wherein the ball and the plunger are in cooperating relationship such that the ball is in the ball-plunger cavity and is disengageable from the locking ramp when no pressure is placed in the ball-plunger cavity and the compression spring pushes the plunger to open up the through hole to the ball-plunger cavity, defining a secondary unlocked state.

3. The end-effector assembly of claim 2 wherein the branch rail is telescopically moveable relative to the crossbar when the drive pin and the branch rail are in the primary unlocked state and when the ball and the plunger are in the secondary unlocked state.

4. The end-effector assembly of claim 1 wherein the swing arm lock comprises:

a swing arm clamp assembly configured to movably secure the swing arm to the branch rail, the clamp assembly comprising:

a roll clamp movably secured to the branch rail, the roll clamp comprising a body and a shaft, the body having a first end extending to a second end, the body having an opening formed through the first and second ends to define an outer wall movably disposed about the branch rail, the shaft having a proximal end extending to a closed distal end, the proximal end disposed on the outer wall and extending therefrom, the body having a slot formed through the outer wall from the first and second ends and through the proximal end of the shaft defining first and second split portions of the shaft, the distal end being closed; and a pitch-yaw clamp movably secured about the shaft and configured to lock and unlock the roll clamp to the branch rail;

a pivot shaft extending through the clamp assembly and configured to rotationally secure the clamp assembly in place;

a swing plate secured to the pivot shaft and configured for engagement with a configuration tool; and a locking fastener extending through the swing plate and into the pivot shaft, wherein the locking fastener is configured to lock and unlock the pitch-yaw clamp about the shaft, thereby locking and unlocking the roll clamp to the branch rail.

5. The end-effector assembly of claim 4 wherein the swing arm lock is movable on the branch rail between an unlocked state and a locked state so as to fix the swing arm in position relative to the branch rail.

6. The end-effector assembly of claim 1 wherein the branch lock further comprises an extension leg for receiving a portion of a tubing, wherein the extension leg is elongated along a protrusion axis arranged perpendicularly to a body axis, the extension leg comprising a spring-loaded tubing reel configured to stretch during use and collapse during non-use.

7. The end-effector assembly of claim 6 wherein the spring-loaded tubing reel comprises a drum having a hub, the reel being coupled to a shaft of a reel support, the drum and reel support being held together with a retaining ring, a spiral-shaped power spring being disposed between the drum and the reel support.

8. An end-effector assembly comprising:

a master boom;

a crossbar coupled to the master boom;

at least one branch rail movably coupled to the crossbar by a branch lock, the at least one branch rail having a driving groove formed longitudinally therealong for telescopic movement relative to the crossbar, the at least one swing branch comprising:

a crossbar clamp slidably and pivotally disposed about the crossbar for slidable and pivotal movement therealong, the crossbar clamp having a clamp arm adjoined with a clamp base defining a clamp recess through which the crossbar is disposed, the clamp arm and clamp base being cooperable to secure and loosen about the crossbar allowing for slidable and pivotal movement therealong;

a branch rail clamp comprising a body having a primary telescoping lock comprising a receiving bore formed therethrough with internal threads in the middle as well as a wedging cavity at the distal end and a wedging collet disposed in the receiving bore, the wedging collet comprising an outer wall and an inner wall defining a branch hole to receive one branch rail, the outer wall having a locking ramp formed thereabout, external threads coupled to the internal threads in the receiving bore and slit taper wall at the distal end, the inner wall having a drive pin extending inwardly therefrom and disposed in the driving groove of the branch rail, the body comprising a secondary telescoping lock having a ball, a plunger and a compression spring disposed in a ball-plunger cavity of the body, the ball-plunger cavity having a through hole in fluid communication with the receiving bore and in alignment with the locking ramp of the wedging collet;

wherein the wedging collet and the wedging cavity are in cooperating relationship such that the slit taper wall of the wedging collet engages with the wedging cavity to prevent telescopic movement of the branch rail relative to the crossbar, defining a primary locked state, and wherein the wedging collet and the wedging cavity are in cooperating relationship such that the slit taper wall of the wedging collet disengages from the wedging cavity to allow telescopic movement of the branch rail relative to the crossbar, defining a primary unlocked state, wherein the ball and the plunger are in cooperating relationship such that the ball is displaced and closed by the plunger in the through hole and is engaged against the locking ramp when positive pressure is placed in the ball-plunger cavity, defining a secondary locked state, and wherein the ball and the plunger are in cooperating relationship such that the ball is in the ball-plunger cavity and is disengageable from the locking ramp when no pressure is placed in the cavity and the compression spring pushes the plunger to open up the through hole to the ball-plunger cavity, defining a secondary unlocked state, wherein the branch rail is telescopically moveable relative to the crossbar when the wedging collet and the wedging cavity are in the primary unlocked state and when the ball and the plunger are in the secondary unlocked state; and a swing arm movably coupled to the at least one branch rail by a swing arm lock.

9. The end-effector assembly of claim 8 wherein the swing arm lock comprises:

a swing arm clamp assembly configured to movably secure the swing arm to the branch rail, the clamp assembly comprising:

a roll clamp movably secured to the branch rail, the roll clamp comprising a body and a shaft, the body having a first end extending to a second end, the body having an opening formed through the first and second ends to define an outer wall movably disposed about the branch rail, the shaft having a proximal end extending to a closed distal end, the proximal end disposed on the outer wall and extending therefrom, the body having a slot formed through the outer wall from the first and second ends and through the proximal end of the shaft defining first and second split portions of the shaft, the distal end being closed; and a pitch-yaw clamp movably secured about the shaft and configured to lock and unlock the roll clamp to the branch rail;

a pivot shaft extending through the clamp assembly and configured to rotationally secure the clamp assembly in place;

a swing plate secured to the pivot shaft and configured for engagement with a configuration tool; and a locking fastener extending through the swing plate and into the pivot shaft, wherein the locking fastener is configured to lock and unlock the pitch-yaw clamp about the shaft, thereby locking and unlocking the roll clamp to the branch rail.

10. The end-effector assembly of claim 9 wherein the swing arm lock is movable on the branch rail between an unlocked and a locked state so as to fix the swing arm in position relative to the branch rail.

11. The end-effector assembly of claim 9 wherein the first end of the roll clamp comprises a first bearing bushing and a first bushing collet attached thereto, the first end having a collar retainer attached to the first bushing collet and wherein the second end comprises a second bearing bushing and second bushing collet attached thereto, the second end having an endcap retainer attached to the second bushing collet.

12. The end-effector assembly of claim 9 further comprising an end tool arranged at a distal end of the swing arm, the end tool defining a first side of the end-effector assembly for engagement with a workpiece, wherein the branch lock and the swing arm lock are configured to be engaged by the configuration tool on a second side of the end-effector assembly opposite to the first side.

13. The end-effector assembly of claim 8 wherein the branch lock further comprises an extension leg for receiving a portion of a tubing, wherein the extension leg is elongated along a protrusion axis arranged perpendicularly to a body axis, the extension leg comprising a spring-loaded tubing reel configured to stretch during use and collapse during non-use.

14. The end-effector assembly of claim 13 wherein the spring-loaded tubing reel comprises a drum having a hub, the reel being coupled to a shaft of a reel support, the drum and reel support being held together with a retaining ring, a spiral-shaped power spring being disposed between the drum and the reel support.

15. An end-effector assembly comprising:

a master boom;

a crossbar coupled to the master boom;

at least one branch rail movably coupled to the crossbar by a branch lock, the at least one branch rail having a driving groove formed longitudinally therealong for telescopic movement relative to the crossbar, the at least one swing branch comprising:

a crossbar clamp slidably and pivotally disposed about the crossbar for slidable and pivotal movement therealong, the crossbar clamp having a clamp arm adjoined with a clamp base defining a clamp recess through which the crossbar is disposed, the clamp arm and clamp base being cooperable to secure and loosen about the crossbar allowing for slidable and pivotal movement therealong;

a branch rail clamp comprising a body having a primary telescoping lock comprising a receiving bore formed therethrough with internal threads in the middle as well as a wedging cavity at the distal end and a wedging collet disposed in the receiving bore, the wedging collet comprising an outer wall and an inner wall defining a branch hole to receive one branch rail, the outer wall having a locking ramp formed thereabout, external threads coupled to the internal threads in the receiving bore and slit taper wall at the distal end, the inner wall having a drive pin extending inwardly therefrom and disposed in the driving groove of the branch rail, the body comprising a secondary telescoping lock having a ball, a plunger disposed and a compression spring in a ball-plunger cavity of the body, the ball-plunger cavity having a through hole in fluid communication with the receiving bore and in alignment with the locking ramp of the wedging collet; and a swing arm movably coupled to the at least one branch rail by a swing arm lock, the swing arm lock comprising:

a swing arm clamp assembly configured to movably secure the swing arm to the branch rail, the clamp assembly comprising:

a roll clamp movably secured to the branch rail, the roll clamp comprising a body and a shaft, the body having a first end extending to a second end, the body having an opening formed through the first and second ends to define an outer wall movably disposed about the branch rail, the shaft having a proximal end extending to a closed distal end, the proximal end disposed on the outer wall and extending therefrom, the body having a slot formed through the outer wall from the first and second ends and through the proximal end of the shaft defining first and second split portions of the shaft, the distal end being closed; and a pitch-yaw clamp movably secured about the shaft and configured to lock and unlock the roll clamp to the branch rail;

a pivot shaft extending through the clamp assembly and configured to rotationally secure the clamp assembly in place;

a swing plate secured to the pivot shaft and configured for engagement with a configuration tool; and a locking fastener extending through the swing plate and into the pivot shaft, wherein the locking fastener is configured to lock and unlock the pitch-yaw clamp about the shaft, thereby locking and unlocking the roll clamp to the branch rail.

16. The end-effector assembly of claim 15 wherein the wedging collet and the wedging cavity are in cooperating relationship such that the slit taper wall of the wedging collet engages with the wedging cavity to prevent telescopic movement of the branch rail relative to the crossbar, defining a primary locked state, and wherein the wedging collet and the wedging cavity are in cooperating relationship such that the slit taper wall of the wedging collet disengages from the wedging cavity to allow telescopic movement of the branch rail relative to the crossbar, defining a primary unlocked state.

17. The end-effector assembly of claim 16 wherein the ball and the plunger are in cooperating relationship such that the ball is displaced and closed by the plunger in the through hole and is engaged against the locking ramp when positive pressure is placed in the cavity, defining a secondary locked state, and wherein the ball and the plunger are in cooperating relationship such that the ball is in the ball-plunger cavity and is disengageable from the locking ramp when no pressure is placed in the cavity and the compression spring pushes the plunger to open up the through hole to the ball-plunger cavity, defining a secondary unlocked state.

18. The end-effector assembly of claim 17 wherein the branch rail is telescopically moveable relative to the crossbar when the drive pin and the branch rail are in the primary unlocked state and when the ball and the plunger are in the secondary unlocked state.

19. The end-effector assembly of claim 15 wherein the branch lock further comprises an extension leg for receiving a portion of a tubing, wherein the extension leg is elongated along a protrusion axis arranged perpendicularly to a body shaft axis.

* * * * *